(12) United States Patent
Lin et al.

(10) Patent No.: US 9,182,572 B2
(45) Date of Patent: Nov. 10, 2015

(54) PHOTOGRAPHING OPTICAL LENS ASSEMBLY, IMAGE CAPTURING DEVICE AND MOBILE TERMINAL

(71) Applicant: LARGAN Precision Co., Ltd., Taichung (TW)

(72) Inventors: Cheng-Chen Lin, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 56 days.

(21) Appl. No.: 14/288,107

(22) Filed: May 27, 2014

(65) Prior Publication Data

US 2015/0286035 A1 Oct. 8, 2015

(30) Foreign Application Priority Data

Apr. 3, 2014 (TW) ............................. 103112622 A

(51) Int. Cl.
*G02B 9/60* (2006.01)
*G02B 13/00* (2006.01)
*H04N 5/225* (2006.01)

(52) U.S. Cl.
CPC .............. *G02B 13/0045* (2013.01); *G02B 9/60* (2013.01); *H04N 5/2253* (2013.01); *H04N 5/2254* (2013.01)

(58) Field of Classification Search
CPC .............. G02B 9/60; G02B 9/62; G02B 9/64; G02B 13/0045; G02B 13/002
USPC .......................... 359/713, 714, 763, 764, 766
See application file for complete search history.

(56) References Cited

U.S. PATENT DOCUMENTS

| | | | | |
|---|---|---|---|---|
| 8,953,257 B1* | 2/2015 | Chen | ................... | G02B 13/0045 359/714 |
| 2012/0154929 A1* | 6/2012 | Tsai | ......................... | G02B 9/60 359/714 |
| 2012/0243108 A1* | 9/2012 | Tsai | ........................ | G02B 13/18 359/713 |
| 2013/0114151 A1* | 5/2013 | Chen | ................... | G02B 13/0045 359/714 |
| 2013/0279022 A1* | 10/2013 | Tang | .................... | G02B 13/0045 359/714 |
| 2014/0098428 A1* | 4/2014 | Shinohara | .......... | G02B 13/0045 359/714 |
| 2014/0098430 A1* | 4/2014 | Chou | ................. | G02B 13/0045 359/764 |
| 2014/0177076 A1* | 6/2014 | Hsu | .......................... | G02B 9/60 359/714 |
| 2015/0049395 A1* | 2/2015 | Chen | ................... | G02B 13/0045 359/714 |

* cited by examiner

*Primary Examiner* — Zachary Wilkes
*Assistant Examiner* — William R Alexander
(74) *Attorney, Agent, or Firm* — Locke Lord LLP; Tim Tingkang Xia, Esq.

(57) ABSTRACT

A photographing optical lens assembly includes, in order from an object side to an image side, a first lens element, a second lens element, a third lens element, a fourth lens element and a fifth lens element. The first lens element has an object-side surface being convex in a paraxial region thereof. The second lens element has an object-side surface being concave in a paraxial region thereof and an image-side surface being convex in a paraxial region thereof. The third lens element has an object-side surface being convex in a paraxial region thereof. The fourth lens element has an object-side surface being concave in a paraxial region thereof and an image-side surface being convex in a paraxial region thereof. The fifth lens element has an object-side surface being convex in a paraxial region thereof and an image-side surface being concave in a paraxial region thereof.

25 Claims, 18 Drawing Sheets

PHOTOGRAPHING OPTICAL LENS ASSEMBLY, IMAGE CAPTURING DEVICE AND MOBILE TERMINAL

RELATED APPLICATIONS

The application claims priority to Taiwan Application Serial Number 103112622, filed Apr. 3, 2014, which is herein incorporated by reference.

BACKGROUND

1. Technical Field

The present disclosure relates to a photographing optical lens assembly, an image capturing device and a mobile terminal. More particularly, the present disclosure relates to a compact photographing optical lens assembly and an image capturing device applicable to a mobile terminal.

2. Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

Other conventional compact optical systems with five-element lens structure enhance image quality and resolution. However, the arrangement of the axial distances between each lens element is not favorable for keeping its optical system compact. Furthermore, the second lens element has its image-side surface being concave in a paraxial region thereof; therefore, it is not favorable for reducing the incident angle of the peripheral region. It is also not favorable for illumination and concentrating the lights of the peripheral region.

SUMMARY

According to one aspect of the present disclosure, a photographing optical lens assembly includes, in order from an object side to an image side, a first lens element, a second lens element, a third lens element, a fourth lens element and a fifth lens element. The first lens element with positive refractive power has an object-side surface being convex in a paraxial region thereof. The second lens element with negative refractive power has an object-side surface being concave in a paraxial region thereof and an image-side surface being convex in a paraxial region thereof. The third lens element with positive refractive power has an object-side surface being convex in a paraxial region thereof. The fourth lens element with negative refractive power has an object-side surface being concave in a paraxial region thereof and an image-side surface being convex in a paraxial region thereof, wherein the object-side surface and the image-side surface of the fourth lens element are aspheric. The fifth lens element with refractive power has an object-side surface being convex in a paraxial region thereof and an image-side surface being concave in a paraxial region thereof, wherein the object-side surface and the image-side surface of the fifth lens element are aspheric, and the image-side surface of the fifth lens element has at least one convex shape in an off-axis region thereof. The photographing optical lens assembly has a total of five lens elements with refractive power. When an axial distance between the first lens element and the second lens element is T12, an axial distance between the second lens element and the third lens element is T23, an axial distance between the third lens element and the fourth lens element is T34, a focal length of the photographing optical lens assembly is f, a focal length of the fourth lens element is f4, and a focal length of the fifth lens element is f5, the following conditions are satisfied:

$T23/T12<1.2;$ $0.75<T34/T12<5.0;$ and $0.50<(f/f5)-(f/f4).$

According to another aspect of the present disclosure, an image capturing device includes the photographing optical lens assembly according to the aforementioned aspect and an image sensor, wherein the image sensor is located on the image side of the photographing optical lens assembly.

According to still another aspect of the present disclosure, a mobile terminal includes the image capturing device according to the aforementioned aspect.

According to yet another aspect of the present disclosure, a photographing optical lens assembly includes, in order from an object side to an image side, a first lens element, a second lens element, a third lens element, a fourth lens element and a fifth lens element. The first lens element with positive refractive power has an object-side surface being convex in a paraxial region thereof. The second lens element with negative refractive power has an object-side surface being concave in a paraxial region thereof and an image-side surface being convex in a paraxial region thereof. The third lens element with positive refractive power has an object-side surface being convex in a paraxial region thereof. The fourth lens element with negative refractive power has an object-side surface being concave in a paraxial region thereof and an image-side surface being convex in a paraxial region thereof, wherein the object-side surface and the image-side surface of the fourth lens element are aspheric. The fifth lens element with refractive power has an object-side surface being convex in a paraxial region thereof and an image-side surface being concave in a paraxial region thereof, wherein the object-side surface and the image-side surface of the fifth lens element are aspheric, and the image-side surface of the fifth lens element has at least one convex shape in an off-axis region thereof. The photographing optical lens assembly has a total of five lens elements with refractive power. When an axial distance between the first lens element and the second lens element is T12, an axial distance between the second lens element and the third lens element is T23, an axial distance between the third lens element and the fourth lens element is T34, a curvature radius of the object-side surface of the second lens element is R3, a curvature radius of the image-side surface of the second lens element is R4, an Abbe number of the second lens element is V2, an Abbe number of the third lens element is V3, and an Abbe number of the fourth lens element is V4, the following conditions are satisfied:

$T23/T12<1.2;$ $0.75<T34/T12<5.0;$ $(R3+R4)/(R3-R4)<-1.25;$ and $1.0<V3/(V2+V4)<2.0.$ According to still yet another aspect of the present disclosure, an image capturing device includes the photographing optical lens assembly according to the foregoing aspect and an image sensor, wherein the image sensor is located on the image side of the photographing optical lens assembly.

According to a further aspect of the present disclosure, a mobile terminal includes the image capturing device according to the foregoing aspect.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
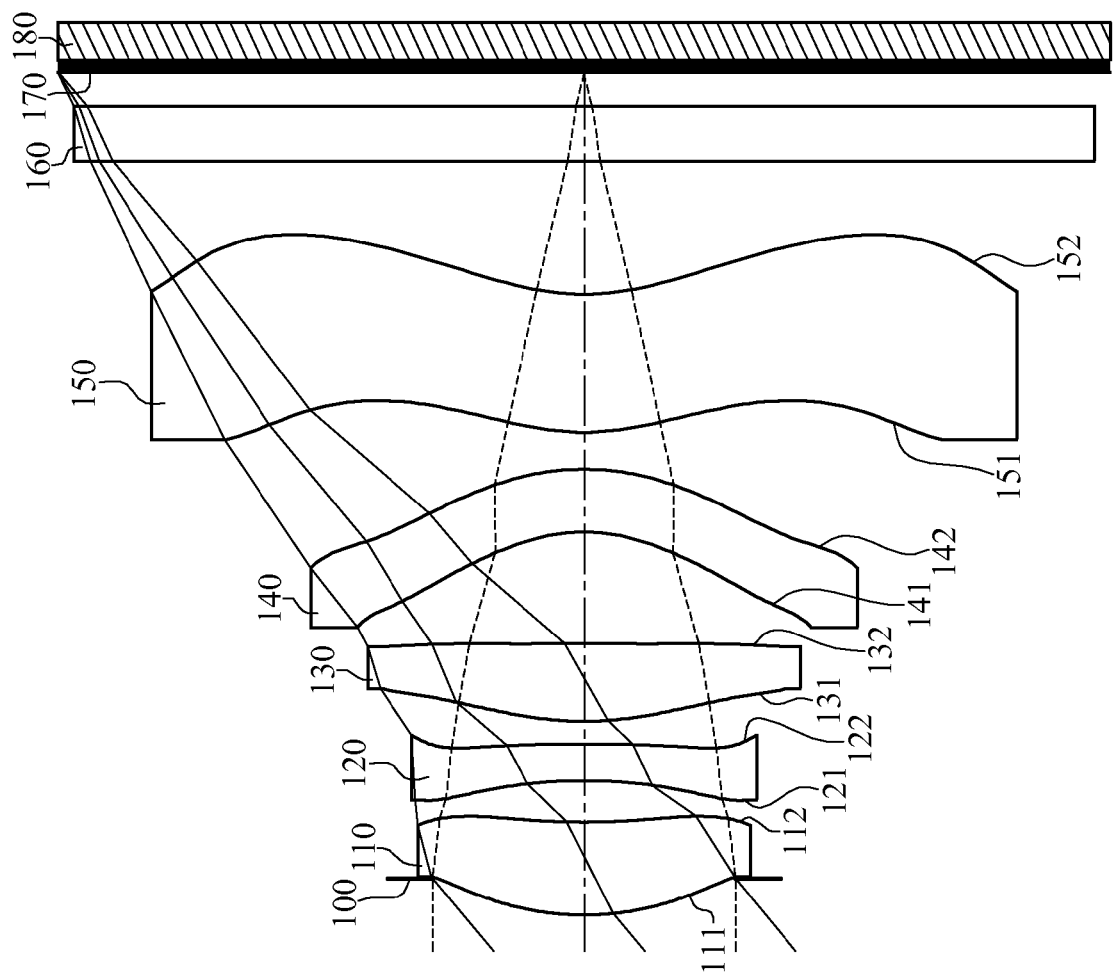
FIG. 1 is a schematic view of an image capturing device according to the 1st embodiment of the present disclosure.

A photographing optical lens assembly includes, in order from an object side to an image side, a first lens element, a second lens element, a third lens element, a fourth lens element and a fifth lens element, wherein the photographing optical lens assembly has a total of five lens elements with refractive power.

The first lens element with positive refractive power has an object-side surface being convex in a paraxial region thereof. Therefore, it provides the photographing optical lens assembly with the positive refractive power as it needs to be and is favorable for reducing the total track length thereof.

The second lens element with negative refractive power has an object-side surface being concave in a paraxial region thereof and an image-side surface being convex in a paraxial region thereof, so that the aberration and astigmatism generated from the first lens element can be corrected. It is also favorable for effectively improving the illumination of the peripheral region.

The third lens element with positive refractive power has an object-side surface being convex in a paraxial region thereof, so that it is favorable for arranging the positive refractive powers of the first lens element and the third lens element, and reducing spherical aberration and photosensitivity of the photographing optical lens assembly so as to improve the image quality. Furthermore, at least one of the object-side surface and the image-side surface of the third lens element has at least one inflection point in an off-axis region thereof. Therefore, it is favorable for reducing the incident angle of the off-axis on an image sensor so as to improve the responding efficiency of the image sensor.

The fourth lens element with negative refractive power has an object-side surface being concave in a paraxial region thereof and an image-side surface being convex in a paraxial region thereof. Therefore, it is favorable for effectively correcting the Petzval's sum so as to improve the flatness of the image plane and reduce the astigmatism.

The fifth lens element can have positive refractive power and an object-side surface being convex in a paraxial region thereof and an image-side surface being concave in a paraxial region thereof, wherein the image-side surface of the fifth lens element has at least one convex shape in an off-axis region thereof. Therefore, the principal point of the photographing optical lens assembly can be positioned away from the image plane so as to reduce the total track length of the photographing optical lens assembly and keep a compact size thereof. It is also favorable for effectively correcting the aberration of the off-axis.

When an axial distance between the first lens element and the second lens element is T12, and an axial distance between the second lens element and the third lens element is T23, the following condition is satisfied: T23/T12<1.2. Therefore, it is favorable for assembling the lens elements and reducing the total track length of the photographing optical lens assembly. Preferably, the following condition is satisfied: T23/T12<0.75.

When the axial distance between the first lens element and the second lens element is T12, and an axial distance between the third lens element and the fourth lens element is T34, the following condition is satisfied: 0.75<T34/T12<5.0. Therefore, it is favorable for assembling the lens elements and reducing the total track length of the photographing optical lens assembly.

When a focal length of the photographing optical lens assembly is f, a focal length of the fourth lens element is f4, and a focal length of the fifth lens element is f5, the following condition is satisfied: 0.50<(f/f5)−(f/f4). Therefore, it is favorable for improving the image quality by reducing the aberration of the photographing optical lens assembly. Preferably, the following condition is satisfied: 0.60<(f/f5)−(f/f4)<1.60.

When a curvature radius of the object-side surface of the second lens element is R3, and a curvature radius of the image-side surface of the second lens element is R4, the following condition is satisfied: $(R3+R4)/(R3-R4)<-1.25$. Therefore, it is favorable for correcting the astigmatism so as to improve the image quality.

When an Abbe number of the second lens element is V2, an Abbe number of the third lens element is V3, and an Abbe number of the fourth lens element is V4, the following condition is satisfied: $1.0<V3/(V2+V4)<2.0$. Therefore, it is favorable for effectively correcting the chromatic aberration of the photographing optical lens assembly and maintaining good image quality thereof.

When the focal length of the photographing optical lens assembly is f, and a curvature radius of the object-side surface of the third lens element is R5, the following condition is satisfied: $0.3<R5/f<2.5$. Therefore, it is favorable for reducing spherical aberration and astigmatism so as to improve the image quality. Preferably, the following condition is satisfied: $0.3<R5/f<1.0$.

When the focal length of the photographing optical lens assembly is f, and a focal length of the second lens element is f2, the following condition is satisfied: $f/f2<-0.40$. Therefore, it is favorable for effectively correcting the aberration of the photographing optical lens assembly so as to maintain a good image quality.

When a maximal field of view of the photographing optical lens assembly is FOV, and the following condition is satisfied: 80 degrees<FOV<100 degrees. Therefore, it's favorable for the photographing optical lens assembly obtaining larger field of view so as to capture more of the image scene.

When a curvature radius of the object-side surface of the first lens element is R1, and the curvature radius of the object-side surface of the third lens element is R5, the following condition is satisfied: $0.5<R5/R1<2.0$. Therefore, it is favorable for effectively reducing the spherical aberration so as to optimize the image quality of the photographing optical lens assembly.

When the focal length of the fourth lens element is f4, and the focal length of the fifth lens element is f5, the following condition is satisfied: $0.55<|f4|/f\ 5.<1.20$. Therefore, it is favorable for correcting the aberration of the photographing optical lens assembly so as to improve the image quality.

When the axial distance between the first lens element and the second lens element is T12, the axial distance between the second lens element and the third lens element is T23, the axial distance between the third lens element and the fourth lens element is T34, and an axial distance between the fourth lens element and the fifth lens element is T45, the following condition is satisfied: $0.9<T34/(T12+T23+T45)<2.0$. Therefore, it is favorable for reducing the total track length of the photographing optical lens assembly by properly adjusting the axial distance so as to keep the size more compact thereof.

According to the photographing optical lens assembly of the present disclosure, the lens elements thereof can be made of glass or plastic material. When the lens elements are made of glass material, the distribution of the refractive power of the photographing optical lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the photographing optical lens assembly can also be reduced.

According to the photographing optical lens assembly of the present disclosure, each of an object-side surface in a paraxial region thereof and an image-side surface has a paraxial region and an off-axis region. The paraxial region refers to the region of the surface where light rays travel close to the optical axis, and the off-axis region refers to the region of the surface where light rays travel away from the optical axis. Particularly, when the lens element has a convex surface, it indicates that the surface is convex in the paraxial region thereof; when the lens element has a concave surface, it indicates that the surface is concave in the paraxial region thereof.

According to the photographing optical lens assembly of the present disclosure, the photographing optical lens assembly can include at least one stop, such as an aperture stop, a glare stop or a field stop. Said glare stop or said field stop is for eliminating the stray light and thereby improving the image resolution thereof.

According to the photographing optical lens assembly of the present disclosure, an aperture stop can be configured as a front stop or a middle stop. A front stop disposed between an imaged object and the first lens element can provide a longer distance between an exit pupil of the photographing optical lens assembly and the image plane and thereby improves the image-sensing efficiency of an image sensor. A middle stop disposed between the first lens element and the image plane is favorable for enlarging the field of view of the photographing optical lens assembly and thereby provides a wider field of view for the same.

The present photographing optical lens assembly can be optionally applied to moving focus optical systems. According to the photographing optical lens assembly of the present disclosure, the photographing optical lens assembly is featured with good correction ability and high image quality, and can be applied to 3D (three-dimensional) image capturing applications, in products such as digital cameras, mobile devices, digital tablets, wearable devices and other mobile terminals.

According to the present disclosure, an image capturing device is provided. The image capturing device includes the photographing optical lens assembly according to the aforementioned photographing optical lens assembly of the present disclosure, and an image sensor, wherein the image sensor is located on the image side of the aforementioned photographing optical lens assembly, that is, the image sensor can be disposed on or near an image plane of the aforementioned photographing optical lens assembly. Preferably, the image capturing device can further include a barrel member, a holding member or a combination thereof.

According to the present disclosure, a mobile terminal is provided, wherein the mobile terminal includes the aforementioned image capturing device. Therefore, the mobile terminal provides good image quality. Preferably, the mobile terminal can further include but not limited to display, control unit, random access memory unit (RAM), storage unit or a combination thereof.

Figure 18:
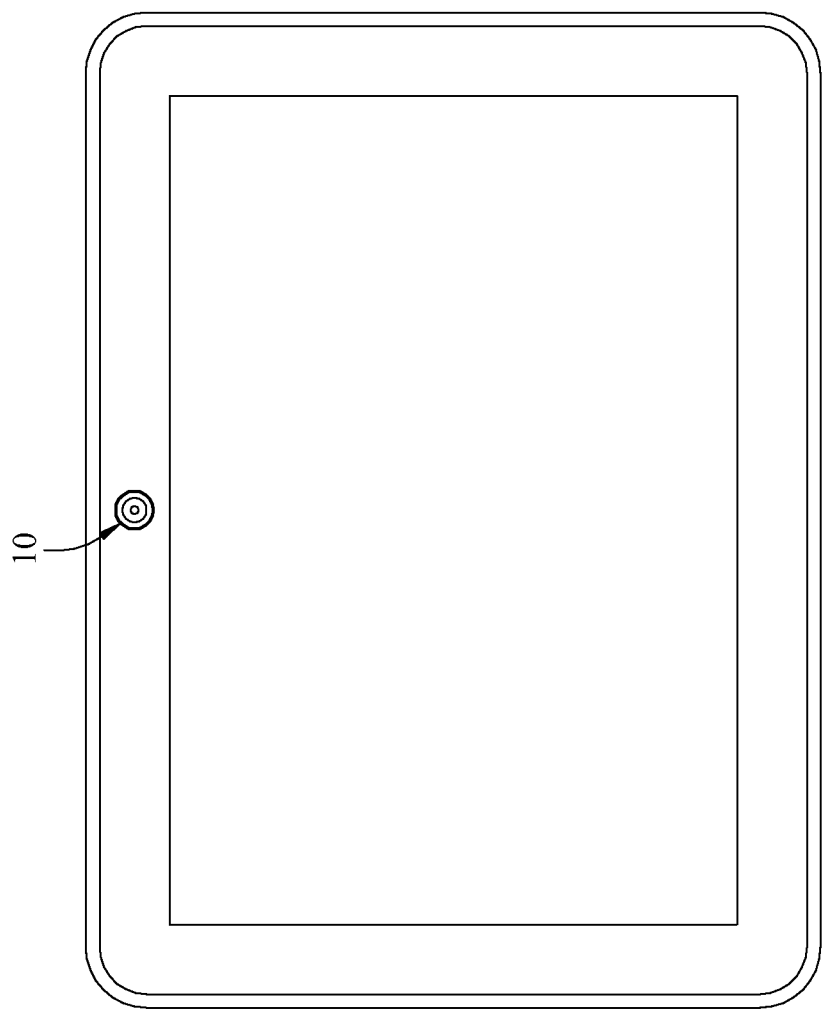
FIG. 18 is a schematic view of a mobile terminal of the present disclosure.
Figure 17:
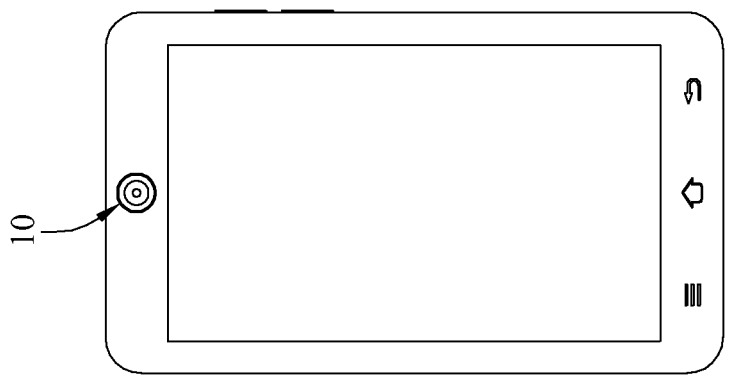
FIG. 17 is a schematic view of a mobile terminal of the present disclosure.
Figure 19:
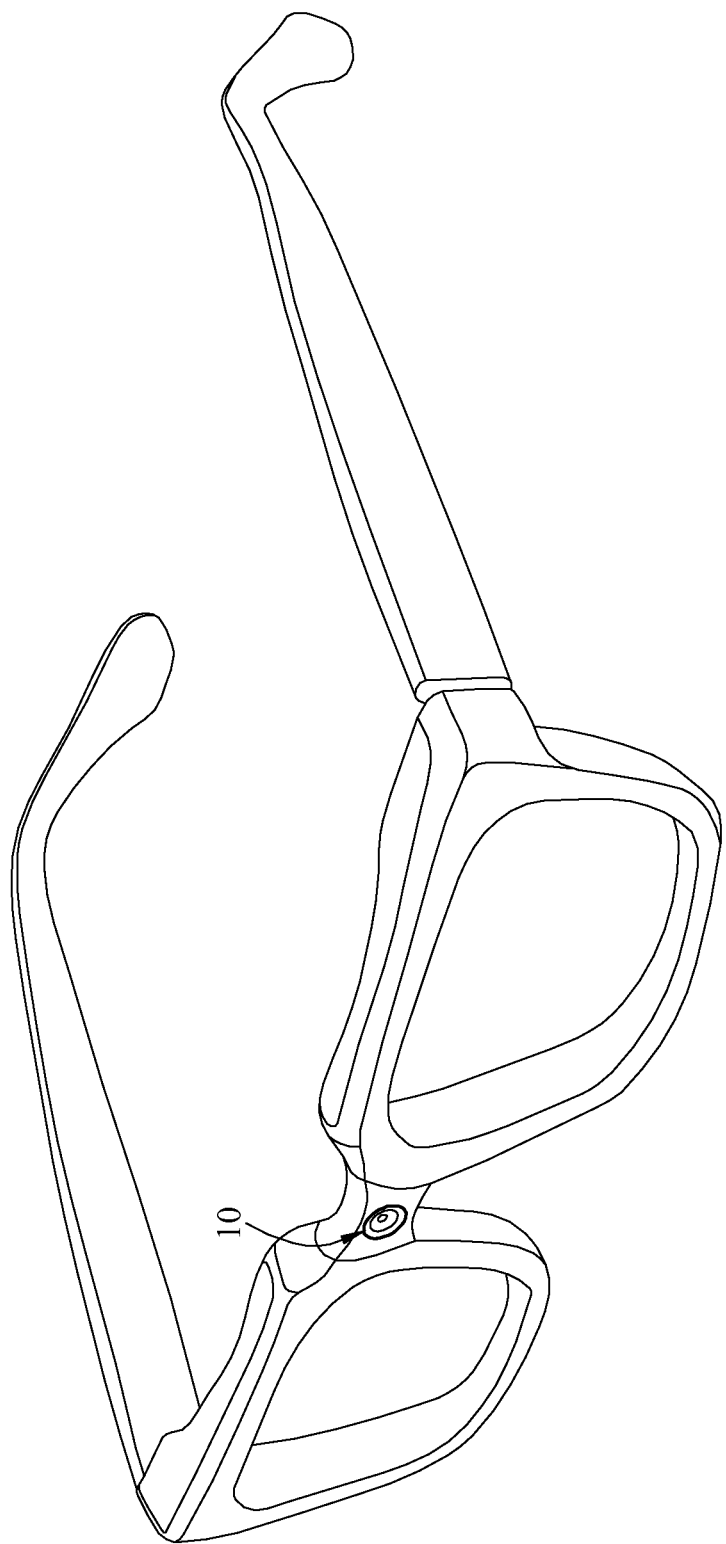
FIG. 19 is a schematic view of a mobile terminal of the present disclosure.

In FIG. 17, FIG. 18 and FIG. 19, an imaging device 10 may be installed in but not limited to a mobile terminal, including a smart phone (FIG. 17), a tablet personal computer (FIG. 18) or a head-mounted (wearable) display (FIG. 19). In some embodiments, the mobile terminal further include, but not limited to, display, a control unit, a random access memory unit (RAM), a read only memory unit (ROM) or a combination thereof.

According to the above description of the present disclosure, the following 1st-8th specific embodiments are provided for further explanation.

1st Embodiment

FIG. 1 is a schematic view of an image capturing device according to the 1st embodiment of the present disclosure.

Figure 2:
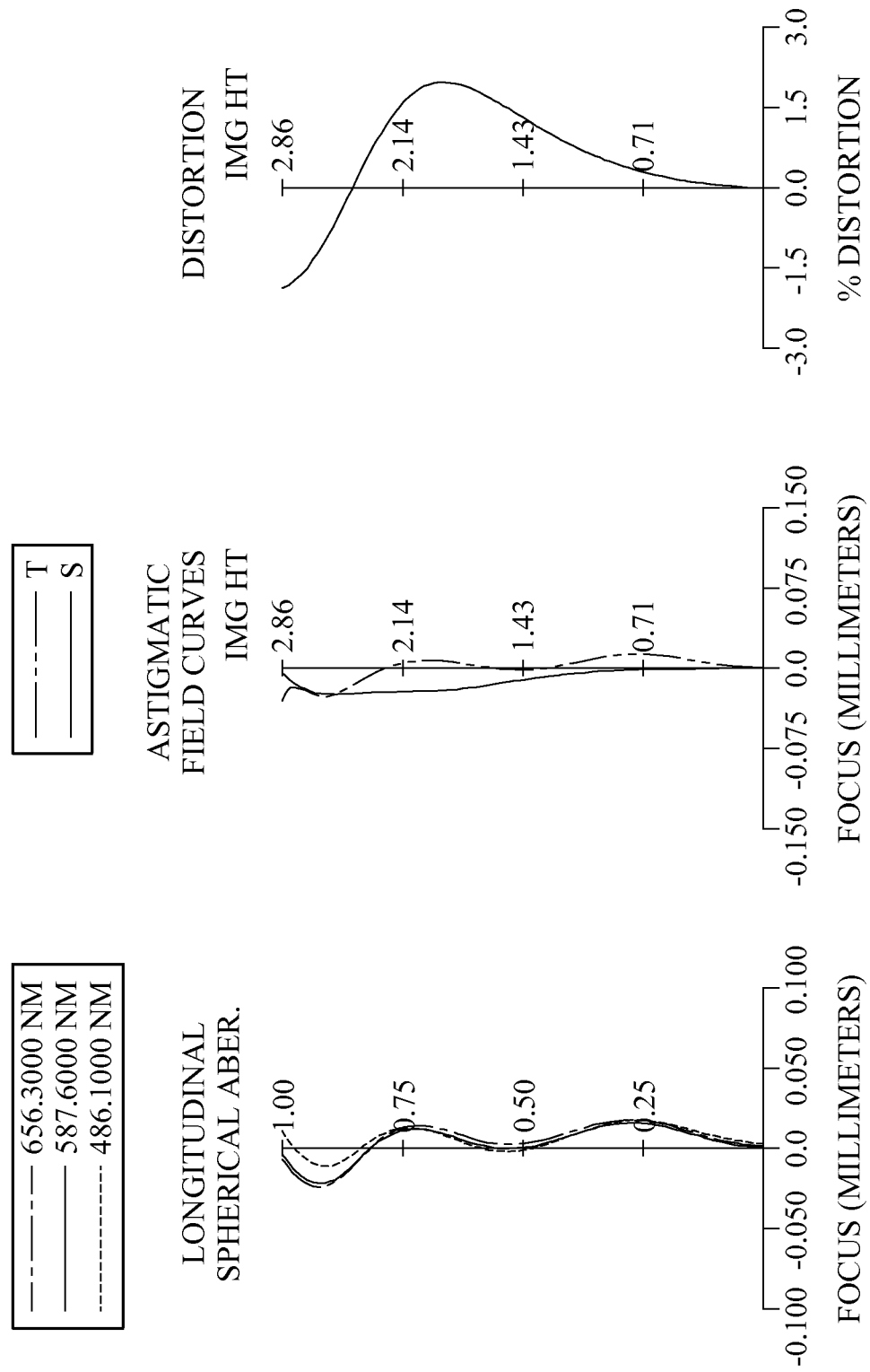
FIG. 2 shows, in order from left to right, spherical aberration curves, astigmatic field curves and a distortion curve of the image capturing device according to the 1st embodiment.

FIG. 2 shows, in order from left to right, spherical aberration curves, astigmatic field curves and a distortion curve of the image capturing device according to the 1st embodiment. In FIG. 1, the image capturing device includes a photographing optical lens assembly and an image sensor 180. The photographing optical lens assembly includes, in order from an object side to an image side, an aperture stop 100, a first lens element 110, a second lens element 120, a third lens element 130, a fourth lens element 140, a fifth lens element 150, an IR-cut filter 160, and an image plane 170, wherein the image sensor 180 is disposed on or near the image plane 170, and the photographing optical lens assembly has a total of five lens elements (110-150) with refractive power.

The first lens element 110 with positive refractive power has an object-side surface 111 being convex in a paraxial region thereof and an image-side surface 112 being concave in a paraxial region thereof. The first lens element 110 is made of plastic material, and the object-side surface 111 and the image-side surface 112 of the first lens element 110 are aspheric.

The second lens element 120 with negative refractive power has an object-side surface 121 being concave in a paraxial region thereof and an image-side surface 121 being convex in a paraxial region thereof. The second lens element 120 is made of plastic material, and the object-side surface 121 and the image-side surface 122 of the second lens element 120 are aspheric.

The third lens element 130 with positive refractive power has an object-side surface 131 being convex in a paraxial region thereof and an image-side surface 132 being convex in a paraxial region thereof. The third lens element 130 is made of plastic material, and the object-side surface 131 and the image-side surface 132 of the third lens element 130 are aspheric. Furthermore, both of the object-side surface 131 and the image-side surface 132 of the third lens element 130 have at least one inflection point in an off-axis region thereof.

The fourth lens element 140 with negative refractive power has an object-side surface 141 being concave in a paraxial region thereof and an image-side surface 142 being convex in a paraxial region thereof. The fourth lens element 140 is made of plastic material, and the object-side surface 141 and the image-side surface 142 of the fourth lens element 140 are aspheric.

The fifth lens element 150 with positive refractive power has an object-side surface 151 being convex in a paraxial region thereof and an image-side surface 152 being concave in a paraxial region thereof. The fifth lens element 150 is made of plastic material, and the object-side surface 151 and the image-side surface 152 of the fifth lens element 150 are aspheric. The image-side surface 151 of the fifth lens element 150 has at least one convex shape in an off-axis region thereof.

The IR-cut filter 160 is made of glass and located between the fifth lens element 150 and the image plane 170, and will not affect the focal length of the photographing optical lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the photographing optical lens assembly of the image capturing device according to the 1st embodiment, when a focal length of the photographing optical lens assembly is f, an f-number of the photographing optical lens assembly is Fno, and half of a maximal field of view of the photographing optical lens assembly is HFOV, these parameters have the following values: f=3.53 mm; Fno=2.15; and HFOV=39.5 degrees.

In the photographing optical lens assembly of the image capturing device according to the 1st embodiment, when an Abbe number of the second lens element 120 is V2, an Abbe number of the third lens element 130 is V3, an Abbe number of the fourth lens element 140 is V4, the following condition is satisfied: V3/(V2+V4)=1.19.

In the photographing optical lens assembly of the image capturing device according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, and an axial distance between the fourth lens element 140 and the fifth lens element 150 is T45, the following conditions are satisfied: T23/T12=0.55; T34/T12=2.69; and T34/(T12+T23+T45)=1.11.

In the photographing optical lens assembly of the image capturing device according to the 1st embodiment, when the focal length of the photographing optical lens assembly is f, a curvature radius of the object-side surface 111 of the first lens element 110 is R1, a curvature radius of the object-side surface 121 of the second lens element 120 is R3, a curvature radius of the image-side surface 122 of the second lens element 120 is R4, and a curvature radius of the object-side surface 131 of the third lens element 130 is R5, the following conditions are satisfied: (R3+R4)/(R3−R4)=−1.46; R5/R1=1.16; and R5/f=0.51.

In the photographing optical lens assembly of the image capturing device according to the 1st embodiment, when the focal length of the photographing optical lens assembly is f, a focal length of the second lens element 120 is f2, a focal length of the fourth lens element 140 is f4, and a focal length of the fifth lens element 150 is f5, the following conditions are satisfied: f/f2=−0.70; |f4|/f5=0.45; and (f/f5)−(f/f4)=0.82.

In the photographing optical lens assembly of the image capturing device according to the 1st embodiment, when a maximal field of view of the photographing optical lens assembly is FOV, and the following condition is satisfied: FOV=79.0 degrees.

The detailed optical data of the 1st embodiment are shown in Table 1 and the aspheric surface data are shown in Table 2 below.

TABLE 1

1st Embodiment
f = 3.53 mm, Fno = 2.15, HFOV = 39.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.199 | | | | |
| 2 | Lens 1 | 1.549 | ASP | 0.505 | Plastic | 1.544 | 55.9 | 4.39 |
| 3 | | 3.902 | ASP | 0.225 | | | | |
| 4 | Lens 2 | −2.592 | ASP | 0.200 | Plastic | 1.639 | 23.5 | −5.03 |
| 5 | | −13.787 | ASP | 0.123 | | | | |
| 6 | Lens 3 | 1.790 | ASP | 0.422 | Plastic | 1.544 | 55.9 | 3.13 |
| 7 | | −31.957 | ASP | 0.606 | | | | |
| 8 | Lens 4 | −0.889 | ASP | 0.342 | Plastic | 1.639 | 23.5 | −6.24 |
| 9 | | −1.315 | ASP | 0.199 | | | | |
| 10 | Lens 5 | 1.306 | ASP | 0.750 | Plastic | 1.535 | 55.7 | 13.90 |
| 11 | | 1.267 | ASP | 0.726 | | | | |
| 12 | IR-cut filter | Plano | | 0.300 | Glass | 1.517 | 64.2 | — |
| 13 | | Plano | | 0.184 | | | | |
| 14 | Image | Plano | | — | | | | |

Note:
Reference wavelength is 587.6 nm (d-line).

TABLE 2

Aspheric Coefficients

| | Surface # | | | | |
|---|---|---|---|---|---|
| | 2 | 3 | 4 | 5 | 6 |
| k = | −8.6115E−01 | −1.0000E+00 | −1.5418E+00 | 6.8510E+01 | −2.9761E+00 |
| A4 = | 6.1672E−03 | −7.7832E−03 | 6.4630E−02 | −8.7614E−02 | −1.1164E−01 |
| A6 = | 1.0049E−01 | −5.8571E−01 | −4.4718E−01 | −1.3681E−01 | −1.5728E−02 |
| A8 = | −5.9482E−01 | 2.1414E+00 | 1.6989E+00 | 1.4070E+00 | 2.1199E−01 |
| A10 = | 1.1826E+00 | −6.0806E+00 | −4.3416E+00 | −3.0745E+00 | −3.3562E−01 |
| A12 = | −1.2411E+00 | 7.9504E+00 | 6.5517E+00 | 3.8490E+00 | 1.3979E−01 |
| A14 = | 4.3565E−01 | −3.7330E+00 | −4.0881E+00 | −2.0934E+00 | 6.9800E−02 |
| A16 = | — | — | 5.9789E−01 | 2.5116E−01 | −4.6189E−02 |

| | Surface # | | | | |
|---|---|---|---|---|---|
| | 7 | 8 | 9 | 10 | 11 |
| k = | −1.0000E+00 | −5.4466E+00 | −4.9166E−01 | −7.6709E+00 | −4.5916E+00 |
| A4 = | 1.0800E−01 | −2.9125E−01 | 7.2238E−02 | −6.8203E−02 | −6.3577E−02 |
| A6 = | −2.6748E−01 | 7.2114E−01 | 7.2433E−02 | −2.6419E−02 | 1.8826E−02 |
| A8 = | 3.1495E−01 | −1.6520E+00 | −2.2627E−01 | 4.2274E−02 | −3.4738E−03 |
| A10 = | −2.6471E−01 | 2.4649E+00 | 3.1937E−01 | −2.4830E−02 | −1.5197E−04 |
| A12 = | 1.5528E−01 | −2.0175E+00 | −1.9262E−01 | 7.5737E−03 | 1.6994E−04 |
| A14 = | −4.9192E−02 | 8.5992E−01 | 5.1920E−02 | −1.1451E−03 | −3.0530E−05 |
| A16 = | 6.2746E−03 | −1.5374E−01 | −5.2503E−03 | 6.8272E−05 | 2.1036E−06 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
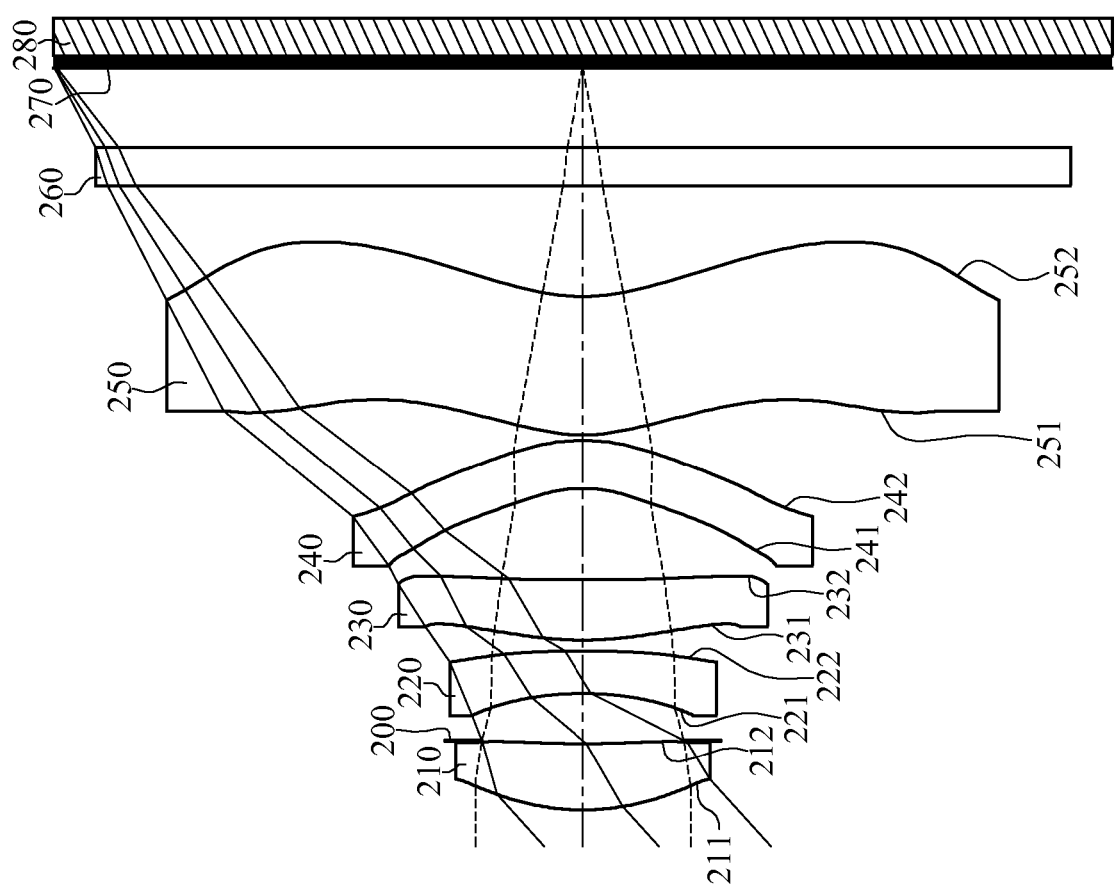
FIG. 3 is a schematic view of an image capturing device according to the 2nd embodiment of the present disclosure.
Figure 4:
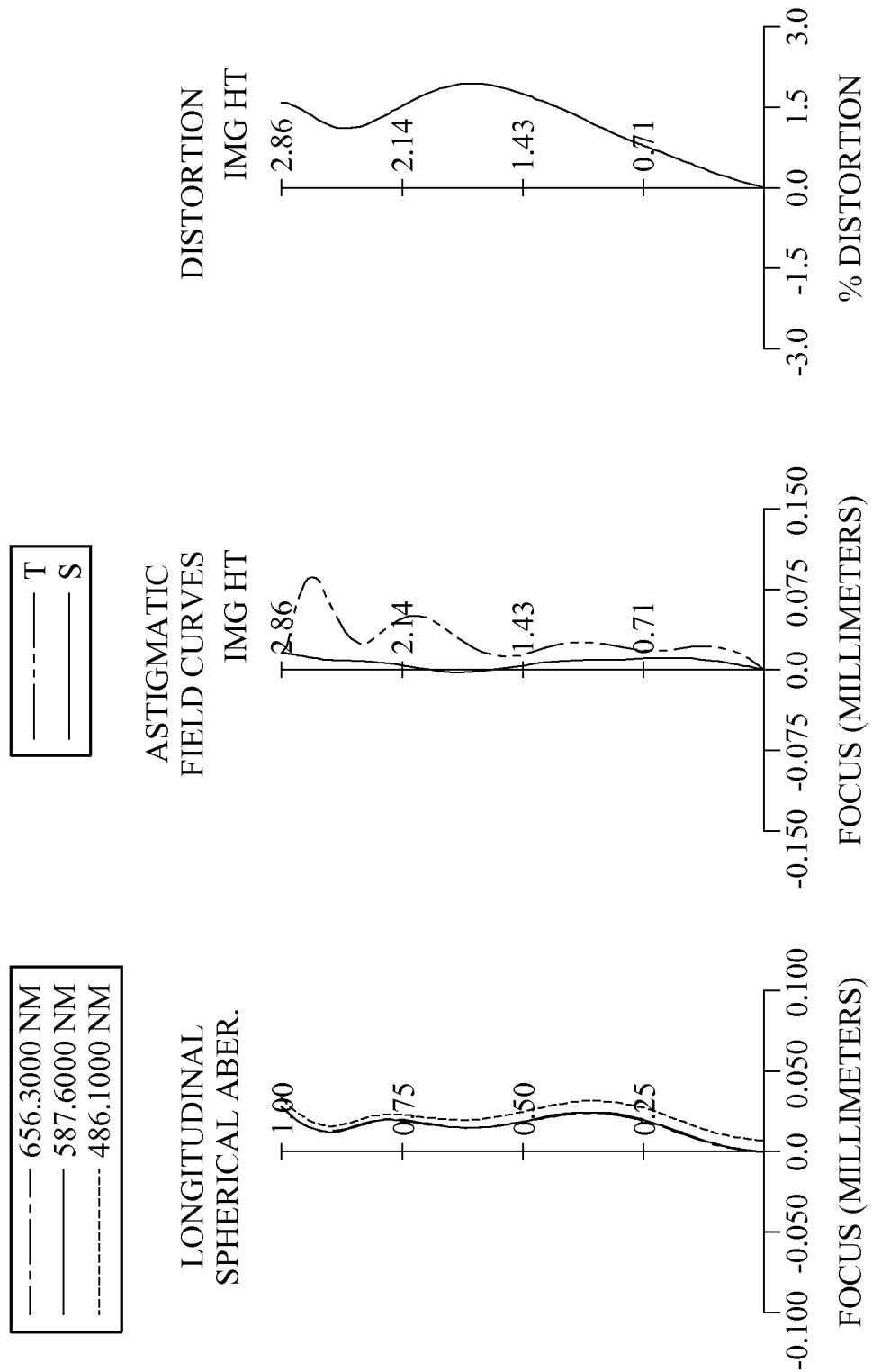
FIG. 4 shows, in order from left to right, spherical aberration curves, astigmatic field curves and a distortion curve of the image capturing device according to the 2nd embodiment.

FIG. 3 is a schematic view of an image capturing device according to the 2nd embodiment of the present disclosure. FIG. 4 shows, in order from left to right, spherical aberration curves, astigmatic field curves and a distortion curve of the image capturing device according to the 2nd embodiment. In FIG. 3, the image capturing device includes a photographing optical lens assembly and an image sensor 280. The photographing optical lens assembly includes, in order from an object side to an image side, a first lens element 210, an aperture stop 200, a second lens element 220, a third lens element 230, a fourth lens element 240, a fifth lens element 250, an IR-cut filter 260 and an image plane 270, wherein the image sensor 280 is disposed on or near the image plane 270, and the photographing optical lens assembly has a total of five lens elements (210-250) with refractive power.

The first lens element 210 with positive refractive power has an object-side surface 211 being convex in a paraxial region thereof and an image-side surface 212 being concave in a paraxial region thereof. The first lens element 210 is made of plastic material, and the object-side surface 211 and the image-side surface 212 of the first lens element 210 are aspheric.

The second lens element 220 with negative refractive power has an object-side surface 221 being concave in a paraxial region thereof and an image-side surface 221 being convex in a paraxial region thereof. The second lens element 220 is made of plastic material, and the object-side surface 221 and the image-side surface 222 of the second lens element 220 are aspheric.

The third lens element 230 with positive refractive power has an object-side surface 231 being convex in a paraxial region thereof and an image-side surface 232 being convex in a paraxial region thereof. The third lens element 230 is made of plastic material, and the object-side surface 231 and the image-side surface 232 of the third lens element 230 are aspheric. Furthermore, both of the object-side surface 231 and the image-side surface 232 of the third lens element 230 have at least one inflection point in an off-axis region thereof.

The fourth lens element 240 with negative refractive power has an object-side surface 241 being concave in a paraxial region thereof and an image-side surface 242 being convex in a paraxial region thereof. The fourth lens element 240 is made of plastic material, and the object-side surface 241 and the image-side surface 242 of the fourth lens element 240 are aspheric.

The fifth lens element 250 with positive refractive power has an object-side surface 251 being convex in a paraxial region thereof and an image-side surface 252 being concave in a paraxial region thereof. The fifth lens element 250 is made of plastic material, and the object-side surface 251 and the image-side surface 252 of the fifth lens element 250 are aspheric. The image-side surface 251 of the fifth lens element 250 has at least one convex shape in an off-axis region thereof.

The IR-cut filter 260 is made of glass and located between the fifth lens element 250 and the image plane 270, and will not affect the focal length of the photographing optical lens assembly.

The detailed optical data of the 2nd embodiment are shown in Table 3 and the aspheric surface data are shown in Table 4 below.

TABLE 3

2nd Embodiment
$f = 3.09$ mm, Fno = 2.65, HFOV = 42.1 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | 1.337 | ASP | 0.361 | Plastic | 1.544 | 55.9 | 3.08 |
| 2 |  | 5.942 | ASP | 0.018 |  |  |  |  |
| 3 | Ape. Stop | Plano |  | 0.254 |  |  |  |  |
| 4 | Lens 2 | −1.690 | ASP | 0.230 | Plastic | 1.633 | 23.4 | −3.76 |
| 5 |  | −6.129 | ASP | 0.059 |  |  |  |  |
| 6 | Lens 3 | 2.139 | ASP | 0.329 | Plastic | 1.530 | 55.8 | 3.64 |
| 7 |  | −18.857 | ASP | 0.492 |  |  |  |  |
| 8 | Lens 4 | −0.658 | ASP | 0.261 | Plastic | 1.633 | 23.4 | −4.46 |
| 9 |  | −0.991 | ASP | 0.030 |  |  |  |  |
| 10 | Lens 5 | 0.957 | ASP | 0.750 | Plastic | 1.530 | 55.8 | 4.89 |
| 11 |  | 1.105 | ASP | 0.600 |  |  |  |  |
| 12 | IR-cut filter | Plano |  | 0.210 | Glass | 1.517 | 64.2 | — |
| 13 |  | Plano |  | 0.429 |  |  |  |  |
| 14 | Image | Plano |  | — |  |  |  |  |

Note:
Reference wavelength is 587.6 nm (d-line).

TABLE 4

Aspheric Coefficients

| | Surface # | | | | |
|---|---|---|---|---|---|
| | 1 | 2 | 4 | 5 | 6 |
| k = | −9.8306E−01 | −1.7653E+01 | −3.0428E+00 | −9.6173E+01 | −3.5988E+00 |
| A4 = | 5.3811E−03 | −2.0506E−02 | 1.3772E−02 | 4.3758E−02 | 1.7612E−01 |
| A6 = | 4.8560E−01 | −1.2159E+00 | −1.8917E+00 | −2.7058E+00 | −1.9289E+00 |
| A8 = | −2.8029E+00 | 8.2830E+00 | 1.1116E+01 | 1.3369E+01 | 5.2541E+00 |
| A10 = | 7.1256E+00 | −3.4870E+01 | −3.6134E+01 | −3.1937E+01 | −6.2452E+00 |
| A12 = | −8.9347E+00 | 6.4776E+01 | 5.4474E+01 | 4.1297E+01 | 7.1635E−01 |
| A14 = | 1.7338E+00 | −4.5727E+01 | −1.9627E+01 | −2.6260E+01 | 5.3957E+00 |
| A16 = | — | — | −2.0375E+01 | 6.0865E+00 | −4.0890E+00 |

| | Surface # | | | | |
|---|---|---|---|---|---|
| | 7 | 8 | 9 | 10 | 11 |
| k = | −9.9000E+01 | −4.8046E+00 | −4.3835E+00 | −8.7881E+00 | −4.8356E+00 |
| A4 = | 2.8814E−01 | 1.3266E−01 | −1.8054E−01 | −1.0311E−01 | −9.6519E−02 |
| A6 = | 1.3144E−01 | −4.9689E−02 | 8.4650E−01 | 7.9984E−02 | 5.8686E−02 |
| A8 = | −3.6261E+00 | 9.2936E−01 | −9.8207E−01 | −7.8799E−02 | −3.2293E−02 |
| A10 = | 9.5438E+00 | −4.5243E+00 | −3.0185E−01 | 4.2369E−02 | 1.1349E−02 |
| A12 = | −1.1485E+01 | 6.3418E+00 | 1.2324E+00 | −1.1440E−02 | −2.4816E−03 |
| A14 = | 6.8970E+00 | −3.3398E+00 | −7.6618E−01 | 1.5269E−03 | 3.0209E−04 |
| A16 = | −1.7526E+00 | 5.0261E−01 | 1.5183E−01 | −8.1010E−05 | −1.5193E−05 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd embodiment | | | |
|---|---|---|---|
| f [mm] | 3.09 | (R3 + R4)/(R3 − R4) | −1.76 |
| Fno | 2.65 | R5/R1 | 1.60 |
| HFOV [deg.] | 42.1 | R5/f | 0.69 |
| V3/(V2 + V4) | 1.19 | f/f2 | −0.82 |
| T23/T12 | 0.22 | |f4|/f5 | 0.91 |
| T34/T12 | 1.81 | (f/f5) − (f/f4) | 1.32 |
| T34/(T12 + T23 + T45) | 1.36 | FOV [deg.] | 84.2 |

3rd Embodiment

Figure 5:
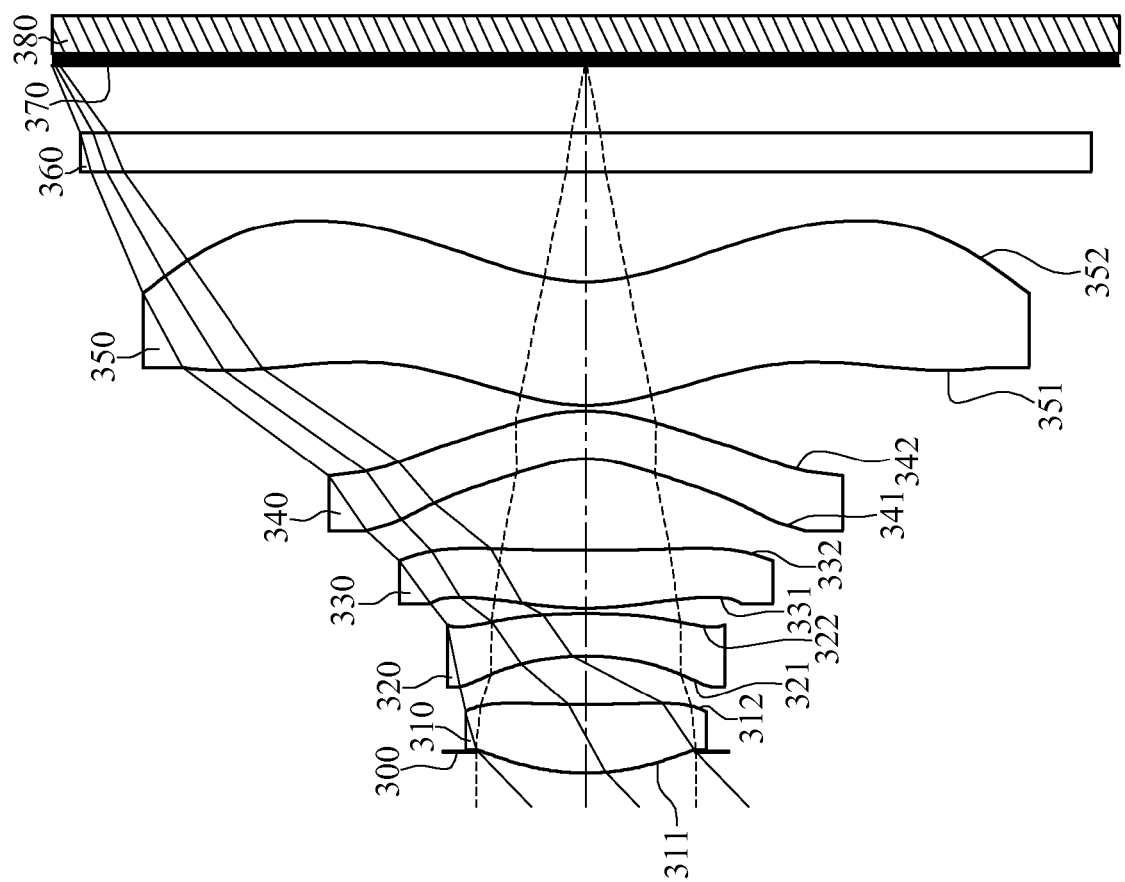
FIG. 5 is a schematic view of an image capturing device according to the 3rd embodiment of the present disclosure.
Figure 6:
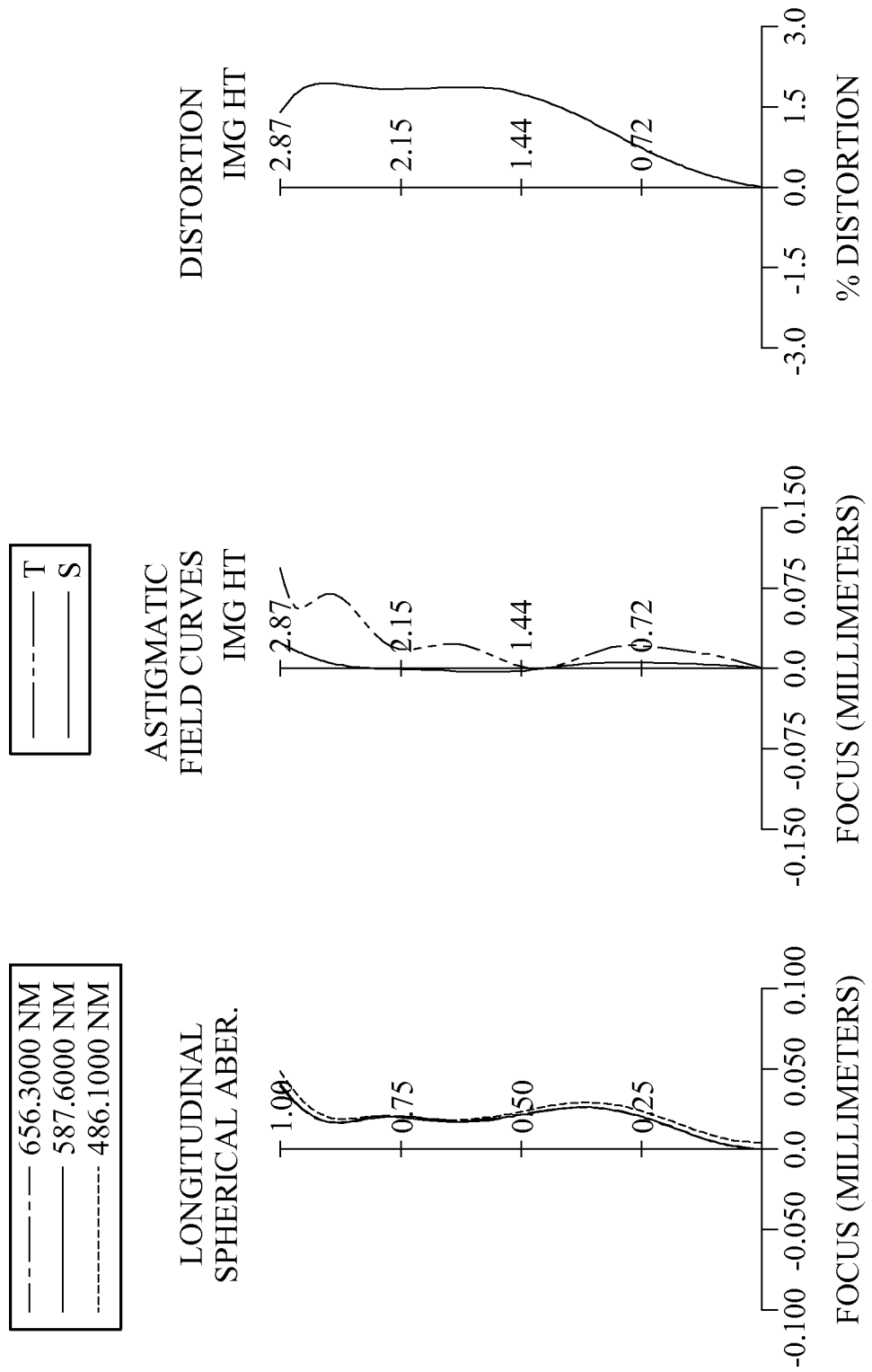
FIG. 6 shows, in order from left to right, spherical aberration curves, astigmatic field curves and a distortion curve of the image capturing device according to the 3rd embodiment.

FIG. 5 is a schematic view of an image capturing device according to the 3rd embodiment of the present disclosure. FIG. 6 shows, in order from left to right, spherical aberration curves, astigmatic field curves and a distortion curve of the image capturing device according to the 3rd embodiment. In FIG. 5, the image capturing device includes a photographing optical lens assembly and an image sensor 380. The photographing optical lens assembly includes, in order from an object side to an image side, an aperture stop 300, a first lens element 310, a second lens element 320, a third lens element 330, a fourth lens element 340, a fifth lens element 350, an IR-cut filter 360 and an image plane 370, wherein the image sensor 380 is disposed on or near the image plane 370, and the photographing optical lens assembly has a total of five lens elements (310-350) with refractive power.

The first lens element 310 with positive refractive power has an object-side surface 311 being convex in a paraxial region thereof and an image-side surface 312 being concave in a paraxial region thereof. The first lens element 310 is made of plastic material, and the object-side surface 311 and the image-side surface 312 of the first lens element 310 are aspheric.

The second lens element 320 with negative refractive power has an object-side surface 321 being concave in a paraxial region thereof and an image-side surface 321 being convex in a paraxial region thereof. The second lens element 320 is made of plastic material, and the object-side surface 321 and the image-side surface 322 of the second lens element 320 are aspheric.

The third lens element 330 with positive refractive power has an object-side surface 331 being convex in a paraxial region thereof and an image-side surface 332 being convex in a paraxial region thereof. The third lens element 330 is made of plastic material, and the object-side surface 331 and the image-side surface 332 of the third lens element 330 are aspheric. Furthermore, both of the object-side surface 331 and the image-side surface 332 of the third lens element 330 have at least one inflection point in an off-axis region thereof.

The fourth lens element 340 with negative refractive power has an object-side surface 341 being concave in a paraxial region thereof and an image-side surface 342 being convex in a paraxial region thereof. The fourth lens element 340 is made of plastic material, and the object-side surface 341 and the image-side surface 342 of the fourth lens element 340 are aspheric.

The fifth lens element 350 with positive refractive power has an object-side surface 351 being convex in a paraxial region thereof and an image-side surface 352 being concave in a paraxial region thereof. The fifth lens element 350 is made of plastic material, and the object-side surface 351 and the image-side surface 352 of the fifth lens element 350 are aspheric. The image-side surface 352 of the fifth lens element 350 has at least one convex shape in an off-axis region thereof.

The IR-cut filter 360 is made of glass and located between the fifth lens element 350 and the image plane 370, and will not affect the focal length of the photographing optical lens assembly.

The detailed optical data of the 3rd embodiment are shown in Table 5 and the aspheric surface data are shown in Table 6 below.

TABLE 5

3rd Embodiment
f = 2.92 mm, Fno = 2.46, HFOV = 44.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.116 | | | | |
| 2 | Lens 1 | 1.316 | ASP | 0.372 | Plastic | 1.544 | 55.9 | 2.98 |
| 3 | | 6.283 | ASP | 0.264 | | | | |
| 4 | Lens 2 | −1.406 | ASP | 0.230 | Plastic | 1.640 | 23.3 | −3.74 |
| 5 | | −3.630 | ASP | 0.030 | | | | |
| 6 | Lens 3 | 2.018 | ASP | 0.315 | Plastic | 1.544 | 55.9 | 3.51 |
| 7 | | −33.128 | ASP | 0.493 | | | | |
| 8 | Lens 4 | −0.680 | ASP | 0.260 | Plastic | 1.640 | 23.3 | −4.95 |
| 9 | | −0.994 | ASP | 0.030 | | | | |
| 10 | Lens 5 | 0.932 | ASP | 0.670 | Plastic | 1.535 | 55.7 | 5.58 |
| 11 | | 1.015 | ASP | 0.600 | | | | |
| 12 | IR-cut filter | Plano | | 0.210 | Glass | 1.517 | 64.2 | — |
| 13 | | Plano | | 0.363 | | | | |
| 14 | Image | Plano | | — | | | | |

Note:
Reference wavelength is 587.6 nm (d-line).
The effective radius of Surface 11 (the image-side surface of the fifth lens element) is 2.400 mm.

TABLE 6

Aspheric Coefficients

| Surface # | | | | | |
|---|---|---|---|---|---|
| | 2 | 3 | 4 | 5 | 6 |
| k = | −1.1244E+00 | −7.6425E+01 | −2.3186E+00 | 8.6431E−01 | −1.1794E+01 |
| A4 = | −3.0595E−03 | −7.0121E−02 | −3.2765E−04 | −1.4424E−02 | 8.2303E−02 |
| A6 = | 3.5012E−01 | −1.5330E+00 | −2.0884E+00 | −2.5865E+00 | −1.6244E+00 |
| A8 = | −2.7590E+00 | 8.3007E+00 | 1.1120E+01 | 1.3660E+01 | 4.7160E+00 |
| A10 = | 7.0974E+00 | −3.4559E+01 | −3.3872E+01 | −3.1753E+01 | −6.9542E+00 |
| A12 = | −1.0113E+01 | 6.5182E+01 | 5.4494E+01 | 4.1297E+01 | 4.6454E+00 |
| A14 = | 1.7338E+00 | −4.5727E+01 | −1.9627E+01 | −2.6263E+01 | −4.9996E−01 |
| A16 = | — | — | −2.0375E+01 | 6.0812E+00 | −9.4569E−01 |

| Surface # | | | | | |
|---|---|---|---|---|---|
| | 7 | 8 | 9 | 10 | 11 |
| k = | −7.8709E+01 | −5.5671E+00 | −5.8477E+00 | −7.4966E+00 | −4.7811E+00 |
| A4 = | 2.8946E−01 | 7.4060E−02 | −1.7502E−01 | −4.4792E−02 | −6.1274E−02 |
| A6 = | −1.7651E−01 | 5.2503E−01 | 1.0641E+00 | −2.5262E−02 | 1.4170E−02 |
| A8 = | −2.7407E+00 | −1.5063E+00 | −2.0240E+00 | 1.7116E−02 | −3.9821E−03 |
| A10 = | 8.1091E+00 | 9.6060E−01 | 1.8313E+00 | −3.3372E−03 | 8.4144E−04 |
| A12 = | −1.0462E+01 | 3.6108E−01 | −8.5282E−01 | 1.8105E−04 | −1.3246E−04 |
| A14 = | 6.5286E+00 | −5.3846E−01 | 1.9740E−01 | 1.7299E−05 | 1.3878E−05 |
| A16 = | −1.5881E+00 | 1.3738E−01 | −1.7986E−02 | −1.8092E−06 | −6.3188E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd embodiment | | | |
|---|---|---|---|
| f [mm] | 2.92 | (R3 + R4)/(R3 − R4) | −2.26 |
| Fno | 2.46 | R5/R1 | 1.53 |
| HFOV [deg.] | 44.0 | R5/f | 0.69 |
| V3/(V2 + V4) | 1.20 | f/f2 | −0.78 |
| T23/T12 | 0.11 | |f4|/f5 | 0.89 |
| T34/T12 | 1.87 | (f/f5) − (f/f4) | 1.11 |
| T34/(T12 + T23 + T45) | 1.52 | FOV [deg.] | 88.0 |

4th Embodiment

Figure 7:
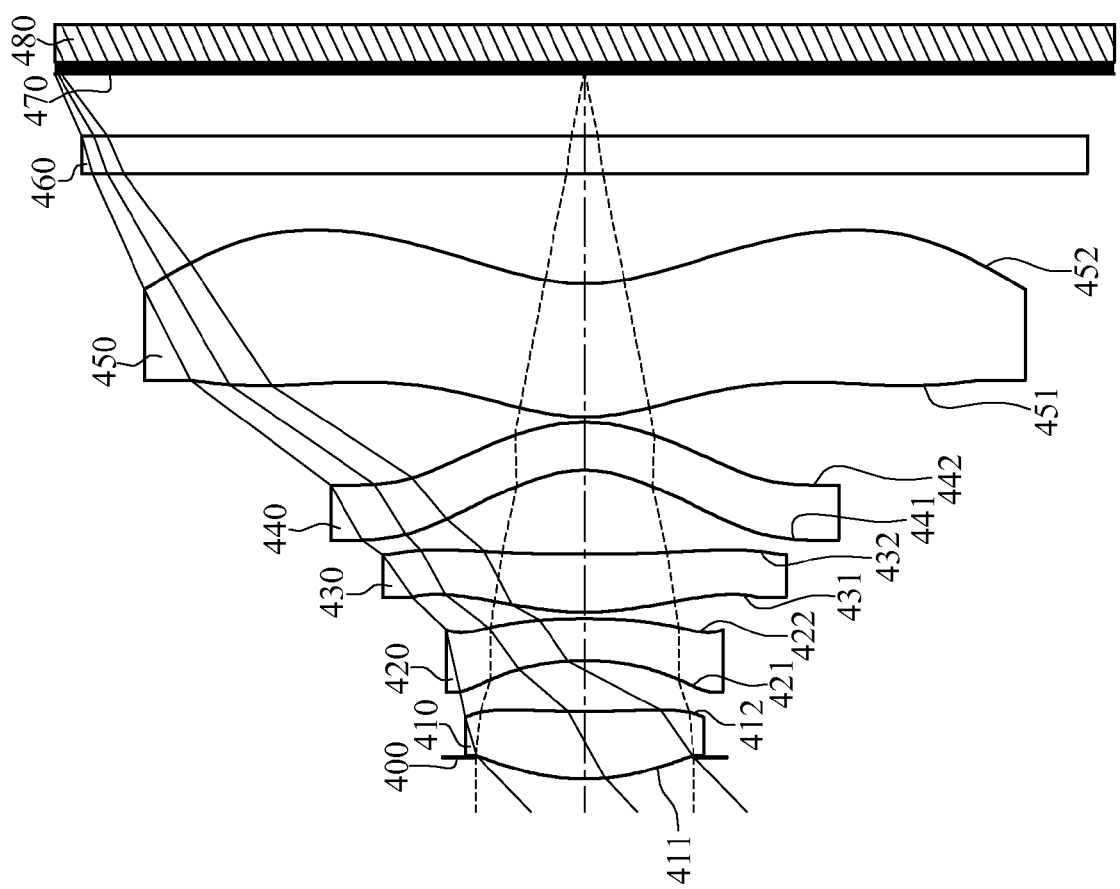
FIG. 7 is a schematic view of an image capturing device according to the 4th embodiment of the present disclosure.
Figure 8:
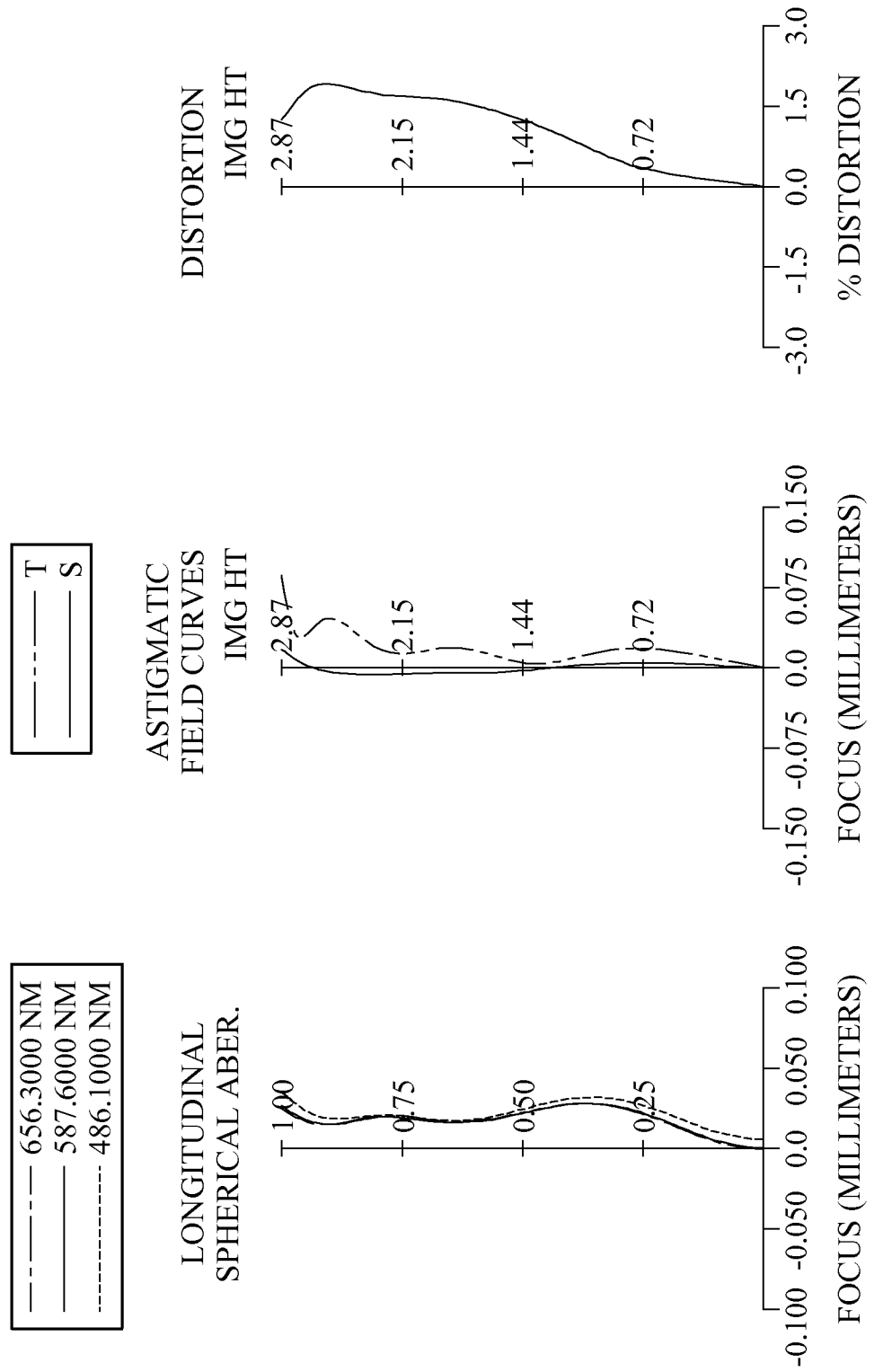
FIG. 8 shows, in order from left to right, spherical aberration curves, astigmatic field curves and a distortion curve of the image capturing device according to the 4th embodiment.

FIG. 7 is a schematic view of an image capturing device according to the 4th embodiment of the present disclosure. FIG. 8 shows, in order from left to right, spherical aberration curves, astigmatic field curves and a distortion curve of the image capturing device according to the 4th embodiment. In FIG. 7, the image capturing device includes a photographing optical lens assembly and an image sensor 480. The photographing optical lens assembly includes, in order from an object side to an image side, an aperture stop 400, a first lens element 410, a second lens element 420, a third lens element 430, a fourth lens element 440, a fifth lens element 450, an IR-cut filter 460 and an image plane 470, wherein the image sensor 480 is disposed on or near the image plane 470, and the photographing optical lens assembly has a total of five lens elements (410-450) with refractive power.

The first lens element 410 with positive refractive power has an object-side surface 411 being convex in a paraxial region thereof and an image-side surface 412 being concave in a paraxial region thereof. The first lens element 410 is made of plastic material, and the object-side surface 411 and the image-side surface 412 of the first lens element 410 are aspheric.

The second lens element 420 with negative refractive power has an object-side surface 421 being concave in a paraxial region thereof and an image-side surface 421 being convex in a paraxial region thereof. The second lens element 420 is made of plastic material, and the object-side surface 421 and the image-side surface 422 of the second lens element 420 are aspheric.

The third lens element 430 with positive refractive power has an object-side surface 431 being convex in a paraxial region thereof and an image-side surface 432 being convex in a paraxial region thereof. The third lens element 430 is made of plastic material, and the object-side surface 431 and the image-side surface 432 of the third lens element 430 are aspheric. Furthermore, both of the object-side surface 431 and the image-side surface 432 of the third lens element 430 have at least one inflection point in an off-axis region thereof.

The fourth lens element 440 with negative refractive power has an object-side surface 441 being concave in a paraxial region thereof and an image-side surface 442 being convex in a paraxial region thereof. The fourth lens element 440 is made of plastic material, and the object-side surface 441 and the image-side surface 442 of the fourth lens element 440 are aspheric.

The fifth lens element 450 with positive refractive power has an object-side surface 451 being convex in a paraxial region thereof and an image-side surface 452 being concave in a paraxial region thereof. The fifth lens element 450 is made of plastic material, and the object-side surface 451 and the image-side surface 452 of the fifth lens element 450 are aspheric. The image-side surface 452 of the fifth lens element 450 has at least one convex shape in an off-axis region thereof.

The IR-cut filter 460 is made of glass and located between the fifth lens element 450 and the image plane 470, and will not affect the focal length of the photographing optical lens assembly.

The detailed optical data of the 4th embodiment are shown in Table 7 and the aspheric surface data are shown in Table 8 below.

TABLE 7

4th Embodiment
f = 2.93 mm, Fno = 2.46, HFOV = 44.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.118 | | | | |
| 2 | Lens 1 | 1.307 | ASP | 0.368 | Plastic | 1.544 | 55.9 | 3.03 |
| 3 | | 5.641 | ASP | 0.278 | | | | |
| 4 | Lens 2 | −1.393 | ASP | 0.230 | Plastic | 1.640 | 23.3 | −3.43 |
| 5 | | −4.054 | ASP | 0.035 | | | | |
| 6 | Lens 3 | 1.625 | ASP | 0.320 | Plastic | 1.544 | 55.9 | 2.94 |
| 7 | | −97.212 | ASP | 0.455 | | | | |
| 8 | Lens 4 | −0.606 | ASP | 0.260 | Plastic | 1.640 | 23.3 | −4.67 |
| 9 | | −0.887 | ASP | 0.030 | | | | |
| 10 | Lens 5 | 1.015 | ASP | 0.727 | Plastic | 1.535 | 55.7 | 6.23 |
| 11 | | 1.096 | ASP | 0.600 | | | | |
| 12 | IR-cut filter | Plano | | 0.210 | Glass | 1.517 | 64.2 | — |
| 13 | | Plano | | 0.335 | | | | |
| 14 | Image | Plano | | — | | | | |

Note:
Reference wavelength is 587.6 nm (d-line).
The effective radius of Surface 11 (the image-side surface of the fifth lens element) is 2.400 mm.

TABLE 8

Aspheric Coefficients

| Surface # | | | | | |
|---|---|---|---|---|---|
| | 2 | 3 | 4 | 5 | 6 |
| k = | −1.0548E+00 | −4.5398E+01 | −2.0188E+00 | 1.2123E+01 | −9.8882E+00 |
| A4 = | −1.2048E−04 | −6.1521E−02 | −7.4568E−02 | −3.3466E−01 | −1.0455E−01 |
| A6 = | 3.4305E−01 | −1.5413E+00 | −1.3923E+00 | −3.9747E−01 | −9.6212E−02 |
| A8 = | −2.7379E+00 | 8.2684E+00 | 6.8141E+00 | 5.7799E+00 | 6.2728E−01 |
| A10 = | 7.1950E+00 | −3.4355E+01 | −2.2845E+01 | −1.7272E+01 | −1.3278E+00 |
| A12 = | −1.0464E+01 | 6.5511E+01 | 5.3134E+01 | 3.0515E+01 | 1.0454E+00 |
| A14 = | 2.2802E+00 | −4.6917E+01 | −5.1153E+01 | −2.5151E+01 | −2.0091E−01 |
| A16 = | — | — | 1.0965E+01 | 6.7674E+00 | −9.1191E−02 |

| Surface # | | | | | |
|---|---|---|---|---|---|
| | 7 | 8 | 9 | 10 | 11 |
| k = | −1.0000E+00 | −4.4849E+00 | −4.1675E+00 | −7.1309E+00 | −5.9800E+00 |
| A4 = | 3.3303E−01 | 6.9037E−02 | 4.2320E−02 | −1.4197E−01 | −5.0500E−02 |
| A6 = | −9.1616E−01 | −6.7405E−01 | −4.2671E−01 | 7.5822E−02 | 1.8944E−03 |
| A8 = | 1.3031E+00 | 1.6329E+00 | 9.4981E−01 | −3.2034E−02 | 5.2119E−03 |
| A10 = | −1.1128E+00 | −1.6524E+00 | −8.1286E−01 | 1.0793E−02 | −2.7022E−03 |
| A12 = | 4.0716E−01 | 8.6025E−01 | 3.4346E−01 | −2.2843E−03 | 6.0632E−04 |
| A14 = | 4.4303E−02 | −2.2823E−01 | −7.2336E−02 | 2.5755E−04 | −6.4652E−05 |
| A16 = | −4.7764E−02 | 2.4392E−02 | 6.0758E−03 | −1.1788E−05 | 2.6871E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th embodiment | | | |
|---|---|---|---|
| f [mm] | 2.93 | (R3 + R4)/(R3 − R4) | −2.05 |
| Fno | 2.46 | R5/R1 | 1.24 |
| HFOV [deg.] | 44.0 | R5/f | 0.55 |
| V3/(V2 + V4) | 1.20 | f/f2 | −0.85 |
| T23/T12 | 0.13 | |f4|/f5 | 0.75 |
| T34/T12 | 1.64 | (f/f5) − (f/f4) | 1.10 |
| T34/(T12 + T23 + T45) | 1.33 | FOV [deg.] | 88.0 |

5th Embodiment

Figure 9:
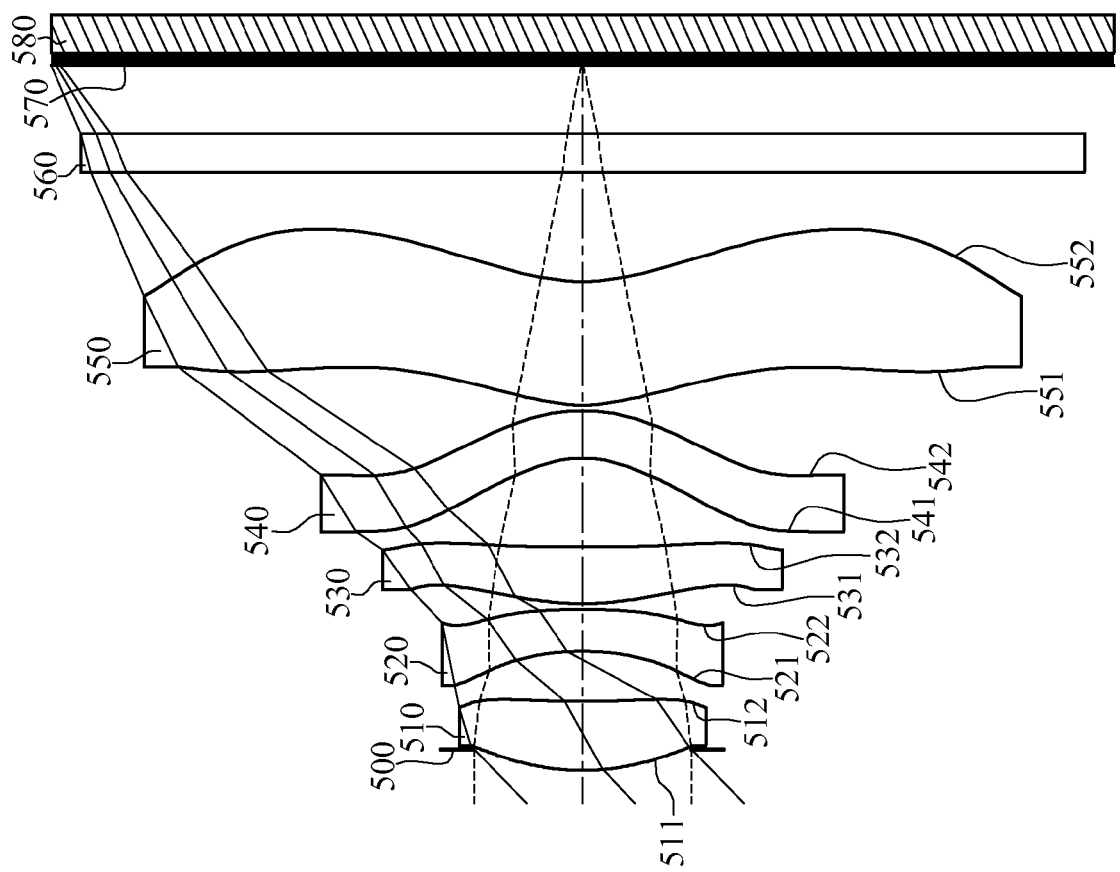
FIG. 9 is a schematic view of an image capturing device according to the 5th embodiment of the present disclosure.
Figure 10:
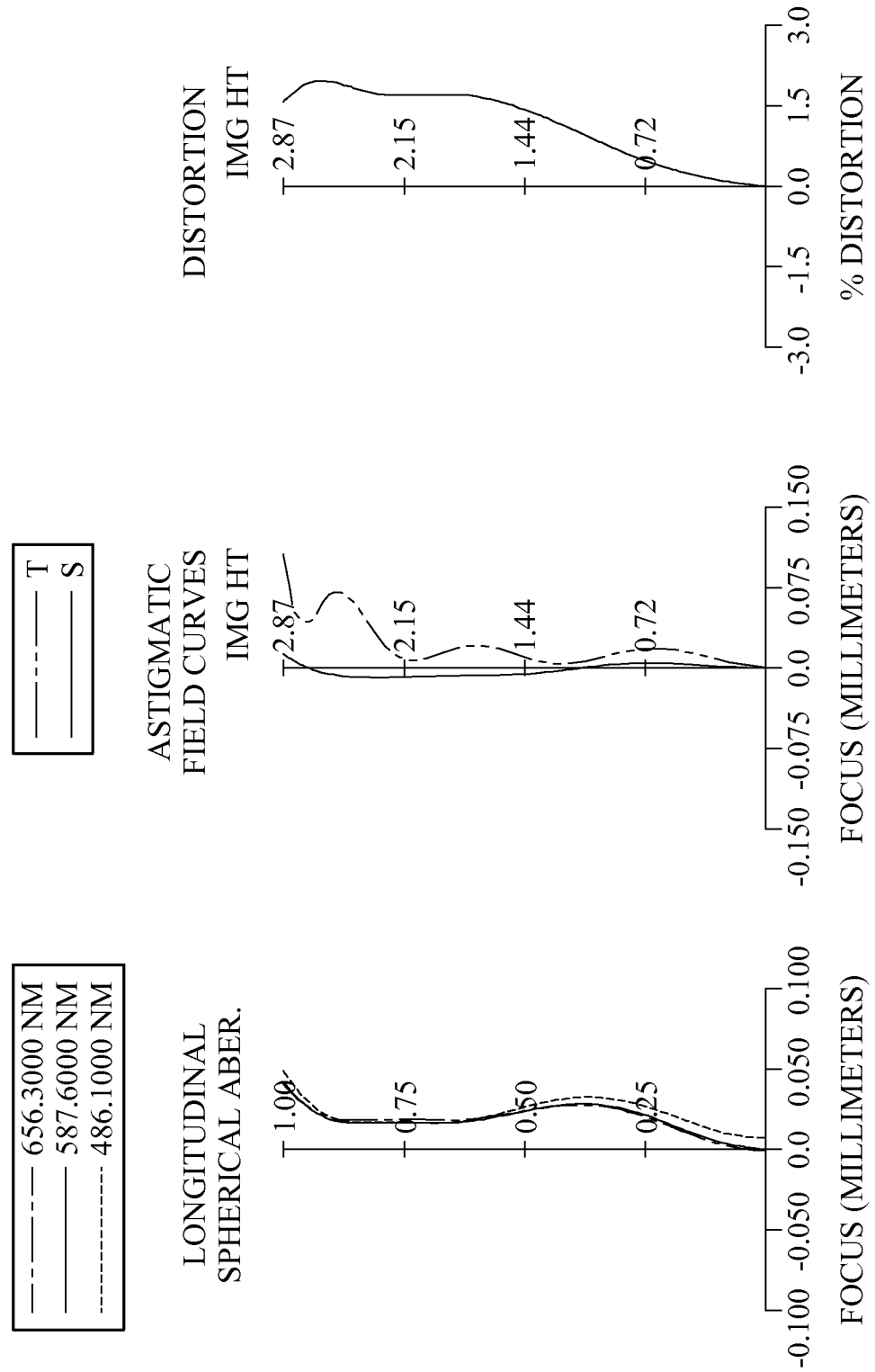
FIG. 10 shows, in order from left to right, spherical aberration curves, astigmatic field curves and a distortion curve of the image capturing device according to the 5th embodiment.

FIG. 9 is a schematic view of an image capturing device according to the 5th embodiment of the present disclosure. FIG. 10 shows, in order from left to right, spherical aberration curves, astigmatic field curves and a distortion curve of the image capturing device according to the 5th embodiment. In FIG. 9, the image capturing device includes a photographing optical lens assembly and an image sensor 580. The photographing optical lens assembly includes, in order from an object side to an image side, an aperture stop 500, a first lens element 510, a second lens element 520, a third lens element 530, a fourth lens element 540, a fifth lens element 550, an IR-cut filter 560 and an image plane 570, wherein the image sensor 580 is disposed on or near the image plane 570, and the photographing optical lens assembly has a total of five lens elements (510-550) with refractive power.

The first lens element 510 with positive refractive power has an object-side surface 511 being convex in a paraxial region thereof and an image-side surface 512 being concave in a paraxial region thereof. The first lens element 510 is made of plastic material, and the object-side surface 511 and the image-side surface 512 of the first lens element 510 are aspheric.

The second lens element 520 with negative refractive power has an object-side surface 521 being concave in a paraxial region thereof and an image-side surface 521 being convex in a paraxial region thereof. The second lens element 520 is made of plastic material, and the object-side surface 521 and the image-side surface 522 of the second lens element 520 are aspheric.

The third lens element 530 with positive refractive power has an object-side surface 531 being convex in a paraxial region thereof and an image-side surface 532 being convex in a paraxial region thereof. The third lens element 530 is made of plastic material, and the object-side surface 531 and the image-side surface 532 of the third lens element 530 are aspheric. Furthermore, both of the object-side surface 531 and the image-side surface 532 of the third lens element 530 have at least one inflection point in an off-axis region thereof.

The fourth lens element 540 with negative refractive power has an object-side surface 541 being concave in a paraxial region thereof and an image-side surface 542 being convex in a paraxial region thereof. The fourth lens element 540 is made of plastic material, and the object-side surface 541 and the image-side surface 542 of the fourth lens element 540 are aspheric.

The fifth lens element 550 with positive refractive power has an object-side surface 551 being convex in a paraxial region thereof and an image-side surface 552 being concave in a paraxial region thereof. The fifth lens element 550 is made of plastic material, and the object-side surface 551 and the image-side surface 552 of the fifth lens element 550 are aspheric. The image-side surface 552 of the fifth lens element 550 has at least one convex shape in an off-axis region thereof.

The IR-cut filter 560 is made of glass and located between the fifth lens element 550 and the image plane 570, and will not affect the focal length of the photographing optical lens assembly.

The detailed optical data of the 5th embodiment are shown in Table 9 and the aspheric surface data are shown in Table 10 below.

TABLE 9

5th Embodiment
f = 2.92 mm, Fno = 2.46, HFOV = 44.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.117 | | | | |
| 2 | Lens 1 | 1.312 | ASP | 0.377 | Plastic | 1.544 | 55.9 | 3.16 |
| 3 | | 5.002 | ASP | 0.274 | | | | |
| 4 | Lens 2 | −1.369 | ASP | 0.230 | Plastic | 1.640 | 23.3 | −3.39 |
| 5 | | −3.950 | ASP | 0.030 | | | | |
| 6 | Lens 3 | 1.555 | ASP | 0.313 | Plastic | 1.544 | 55.9 | 2.76 |
| 7 | | −39.275 | ASP | 0.482 | | | | |
| 8 | Lens 4 | −0.572 | ASP | 0.260 | Plastic | 1.640 | 23.3 | −4.06 |
| 9 | | −0.863 | ASP | 0.030 | | | | |
| 10 | Lens 5 | 0.946 | ASP | 0.675 | Plastic | 1.535 | 55.7 | 5.09 |
| 11 | | 1.089 | ASP | 0.600 | | | | |
| 12 | IR-cut filter | Plano | | 0.210 | Glass | 1.517 | 64.2 | — |
| 13 | | Plano | | 0.375 | | | | |
| 14 | Image | Plano | | — | | | | |

Note:
Reference wavelength is 587.6 nm (d-line).

TABLE 10

Aspheric Coefficients

| | Surface # | | | | |
|---|---|---|---|---|---|
| | 2 | 3 | 4 | 5 | 6 |
| k = | −1.0432E+00 | −4.1269E+01 | −2.1514E+00 | 1.4744E+01 | −8.7293E+00 |
| A4 = | −1.3659E−04 | −4.2394E−02 | −3.7282E−02 | −2.9775E−01 | −7.1364E−02 |
| A6 = | 3.8106E−01 | −1.5406E+00 | −2.3845E+00 | −1.3779E+00 | −5.1048E−01 |
| A8 = | −2.7358E+00 | 8.3446E+00 | 1.4436E+01 | 1.0925E+01 | 2.5736E+00 |
| A10 = | 7.1354E+00 | −3.5084E+01 | −5.6584E+01 | −3.0989E+01 | −6.4119E+00 |
| A12 = | −9.9582E+00 | 6.7084E+01 | 1.3304E+02 | 4.9504E+01 | 8.8536E+00 |

TABLE 10-continued

| Aspheric Coefficients | | | | |
|---|---|---|---|---|
| A14 = | 2.0595E+00 | −4.7658E+01 | −1.4507E+02 | −3.7222E+01 | −6.8586E+00 |
| A16 = | — | — | 5.4246E+01 | 9.2128E+00 | 2.2764E+00 |

| | Surface # | | | | |
|---|---|---|---|---|---|
| | 7 | 8 | 9 | 10 | 11 |
| k = | −1.2518E+01 | −4.5680E+00 | −4.1681E+00 | −7.7433E+00 | −5.7354E+00 |
| A4 = | 3.4660E−01 | −2.7518E−01 | −1.8257E−01 | −1.1710E−01 | −6.3195E−02 |
| A6 = | −7.5840E−01 | 4.9174E−01 | 1.7481E−01 | 6.2623E−02 | 1.5223E−02 |
| A8 = | 3.8488E−01 | −3.9703E−01 | 1.9717E−01 | −2.9871E−02 | −2.5114E−03 |
| A10 = | 9.6497E−01 | 3.7026E−01 | −2.8542E−01 | 1.0796E−02 | −2.6451E−04 |
| A12 = | −2.0088E+00 | −2.5901E−01 | 1.3627E−01 | −2.3093E−03 | 1.7157E−04 |
| A14 = | 1.4371E+00 | 8.6868E−02 | −3.0278E−02 | 2.5794E−04 | −2.3947E−05 |
| A16 = | −3.5879E−01 | −1.0507E−02 | 2.6594E−03 | −1.1652E−05 | 1.1708E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th embodiment | | | |
|---|---|---|---|
| f [mm] | 2.92 | (R3 + R4)/(R3 − R4) | −2.06 |
| Fno | 2.46 | R5/R1 | 1.18 |
| HFOV [deg.] | 44.0 | R5/f | 0.53 |
| V3/(V2 + V4) | 1.20 | f/f2 | −0.86 |
| T23/T12 | 0.11 | |f4|/f5 | 0.80 |
| T34/T12 | 1.76 | (f/f5) − (f/f4) | 1.29 |
| T34/(T12 + T23 + T45) | 1.44 | FOV [deg.] | 88.0 |

6th Embodiment

Figure 11:
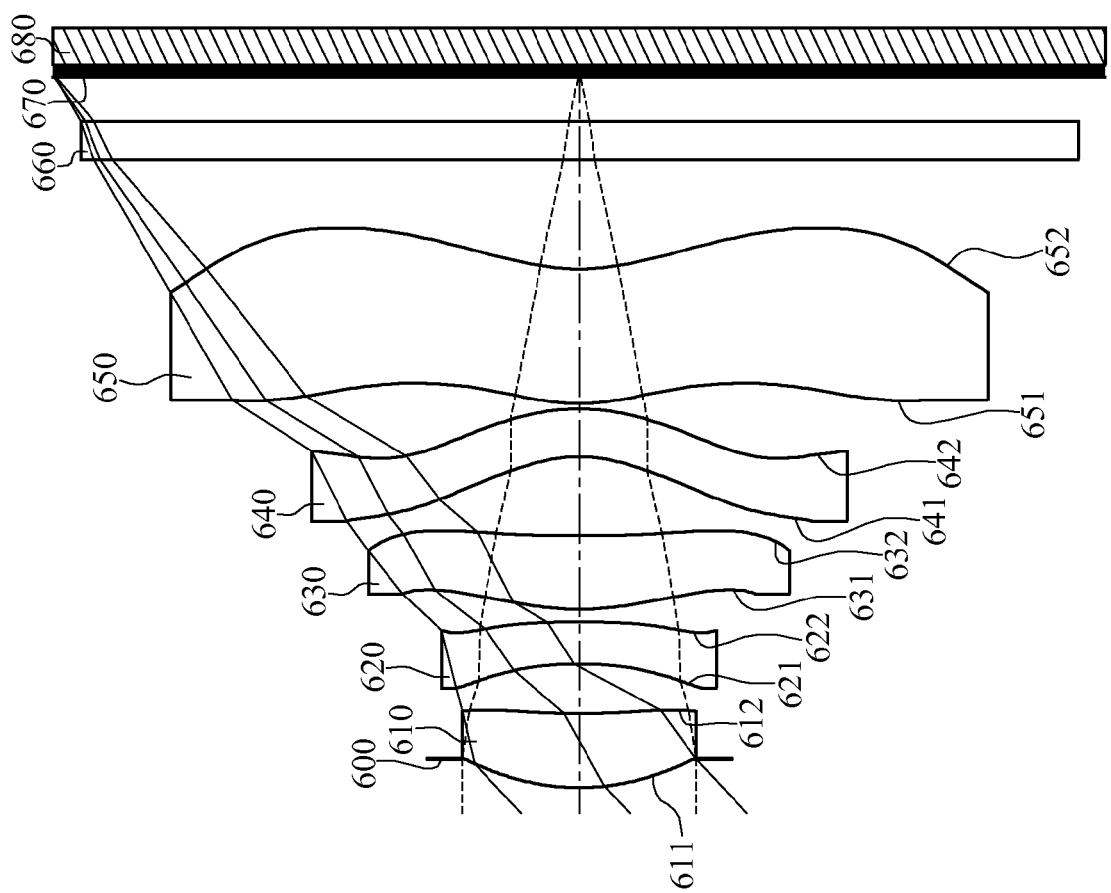
FIG. 11 is a schematic view of an image capturing device according to the 6th embodiment of the present disclosure.
Figure 12:
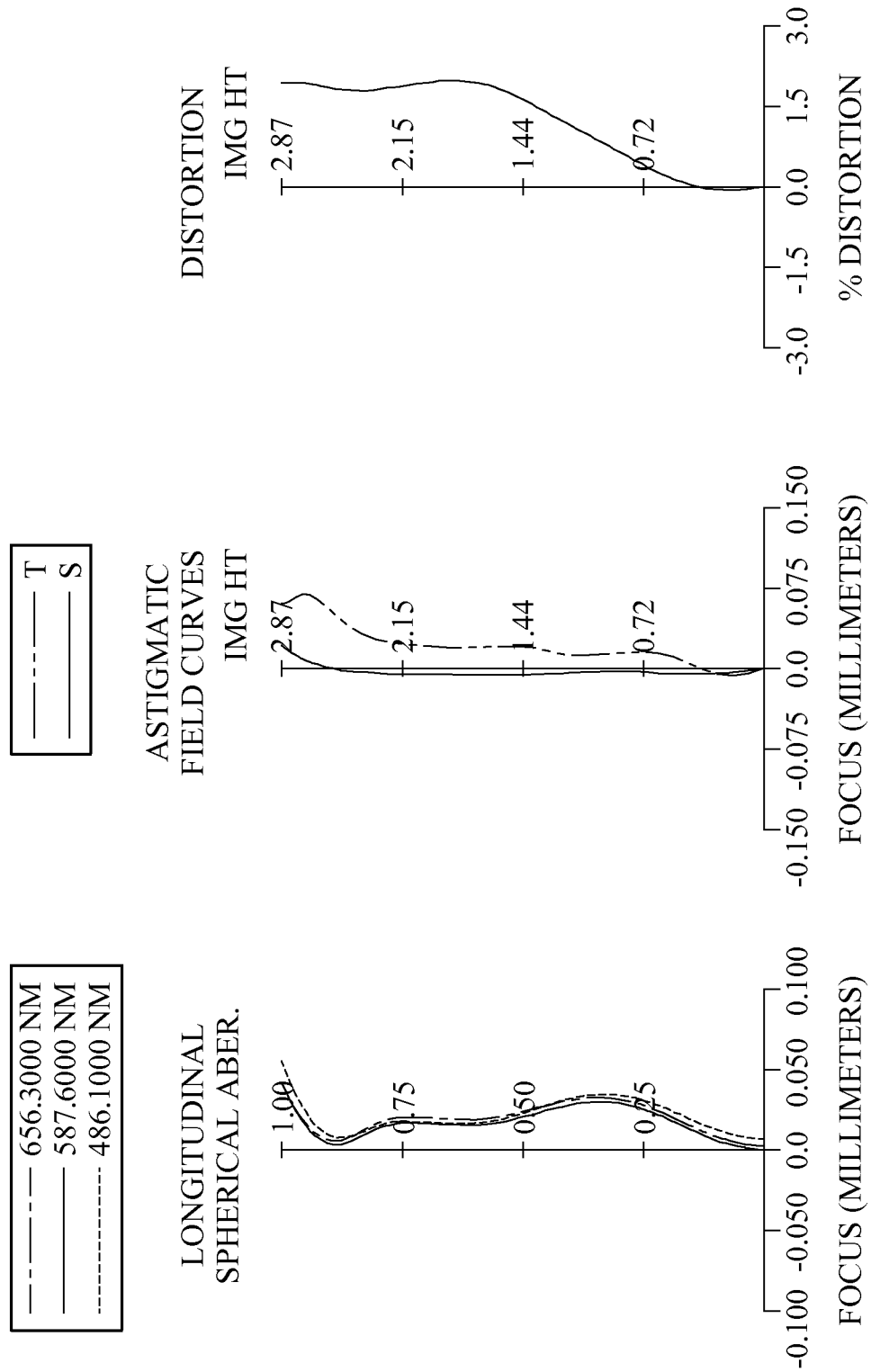
FIG. 12 shows, in order from left to right, spherical aberration curves, astigmatic field curves and a distortion curve of the image capturing device according to the 6th embodiment.

FIG. 11 is a schematic view of an image capturing device according to the 6th embodiment of the present disclosure. FIG. 12 shows, in order from left to right, spherical aberration curves, astigmatic field curves and a distortion curve of the image capturing device according to the 6th embodiment. In FIG. 11, the image capturing device includes a photographing optical lens assembly and an image sensor 680. The photographing optical lens assembly includes, in order from an object side to an image side, an aperture stop 600, a first lens element 610, a second lens element 620, a third lens element 630, a fourth lens element 640, a fifth lens element 650, an IR-cut filter 660 and an image plane 670, wherein the image sensor 680 is disposed on or near the image plane 670, and the photographing optical lens assembly has a total of five lens elements (610-650) with refractive power.

The first lens element 610 with positive refractive power has an object-side surface 611 being convex in a paraxial region thereof and an image-side surface 612 being concave in a paraxial region thereof. The first lens element 610 is made of plastic material, and the object-side surface 611 and the image-side surface 612 of the first lens element 610 are aspheric.

The second lens element 620 with negative refractive power has an object-side surface 621 being concave in a paraxial region thereof and an image-side surface 621 being convex in a paraxial region thereof. The second lens element 620 is made of plastic material, and the object-side surface 621 and the image-side surface 622 of the second lens element 620 are aspheric.

The third lens element 630 with positive refractive power has an object-side surface 631 being convex in a paraxial region thereof and an image-side surface 632 being concave in a paraxial region thereof. The third lens element 630 is made of plastic material, and the object-side surface 631 and the image-side surface 632 of the third lens element 630 are aspheric. Furthermore, both of the object-side surface 631 and the image-side surface 632 of the third lens element 630 have at least one inflection point in an off-axis region thereof.

The fourth lens element 640 with negative refractive power has an object-side surface 641 being concave in a paraxial region thereof and an image-side surface 642 being convex in a paraxial region thereof. The fourth lens element 640 is made of plastic material, and the object-side surface 641 and the image-side surface 642 of the fourth lens element 640 are aspheric.

The fifth lens element 650 with positive refractive power has an object-side surface 651 being convex in a paraxial region thereof and an image-side surface 652 being concave in a paraxial region thereof. The fifth lens element 650 is made of plastic material, and the object-side surface 651 and the image-side surface 652 of the fifth lens element 650 are aspheric. The image-side surface 652 of the fifth lens element 650 has at least one convex shape in an off-axis region thereof.

The IR-cut filter 660 is made of glass and located between the fifth lens element 650 and the image plane 670, and will not affect the focal length of the photographing optical lens assembly.

The detailed optical data of the 6th embodiment are shown in Table 11 and the aspheric surface data are shown in Table 12 below.

TABLE 11

6th Embodiment
f = 3.01 mm, Fno = 2.35, HFOV = 43.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.156 | | | | |
| 2 | Lens 1 | 1.280 | ASP | 0.406 | Plastic | 1.544 | 55.9 | 3.24 |
| 3 | | 4.142 | ASP | 0.272 | | | | |
| 4 | Lens 2 | −1.836 | ASP | 0.230 | Plastic | 1.650 | 21.4 | −3.97 |
| 5 | | −6.686 | ASP | 0.069 | | | | |
| 6 | Lens 3 | 1.492 | ASP | 0.404 | Plastic | 1.544 | 55.9 | 2.99 |
| 7 | | 16.629 | ASP | 0.432 | | | | |
| 8 | Lens 4 | −0.694 | ASP | 0.261 | Plastic | 1.650 | 21.4 | −3.95 |
| 9 | | −1.092 | ASP | 0.030 | | | | |
| 10 | Lens 5 | 1.105 | ASP | 0.737 | Plastic | 1.583 | 30.2 | 6.18 |
| 11 | | 1.202 | ASP | 0.600 | | | | |
| 12 | IR-cut filter | Plano | | 0.210 | Glass | 1.517 | 64.2 | — |
| 13 | | Plano | | 0.242 | | | | |
| 14 | Image | Plano | | — | | | | |

Note:
Reference wavelength is 587.6 nm (d-line).
The effective radius of Surface 10 is 1.900 mm.

TABLE 12

Aspheric Coefficients

| Surface # | | | | | |
|---|---|---|---|---|---|
| | 2 | 3 | 4 | 5 | 6 |
| k = | −9.7320E−01 | −1.0565E+01 | −1.2434E+00 | 1.1862E+01 | −9.1400E+00 |
| A4 = | 5.0838E−03 | −2.2468E−02 | −1.4009E−01 | −4.6611E−01 | −1.0655E−01 |
| A6 = | 4.4778E−01 | −1.3626E+00 | −4.8567E−01 | 4.6435E−01 | −1.0257E+00 |
| A8 = | −2.7626E+00 | 8.4128E+00 | 3.6662E+00 | 1.7298E+00 | 6.4229E−01 |
| A10 = | 7.2442E+00 | −3.4146E+01 | −1.3390E+01 | −4.0873E+00 | −1.3236E+00 |
| A12 = | −9.4687E+00 | 6.5373E+01 | 2.8719E+01 | 1.2621E+01 | 1.0344E+00 |
| A14 = | 3.6142E+00 | −4.7030E+01 | −1.8653E+01 | 1.0066E+01 | −2.1051E−01 |
| A16 = | — | — | −5.5276E+00 | −1.0116E+01 | −8.0373E−02 |

| Surface # | | | | | |
|---|---|---|---|---|---|
| | 7 | 8 | 9 | 10 | 11 |
| k = | −9.9000E+01 | −5.6877E+00 | −4.0981E+00 | −8.8871E+00 | −5.2901E+00 |
| A4 = | 2.9093E−01 | 9.6013E−02 | 6.3184E−02 | −2.6442E−01 | −1.3000E−01 |
| A6 = | −9.1297E−01 | −7.0563E−01 | −4.8268E−01 | 2.2161E−01 | 7.9680E−02 |
| A8 = | 1.3135E+00 | 1.6624E+00 | 1.1195E+00 | −1.3279E−01 | −3.8958E−02 |
| A10 = | −1.1162E+00 | −1.7358E+00 | −1.0135E+00 | 5.3631E−02 | 1.2383E−02 |
| A12 = | 3.9951E−01 | 9.4865E−01 | 4.5875E−01 | −1.2915E−02 | −2.4592E−03 |
| A14 = | 4.0315E−02 | −2.6695E−01 | −1.0487E−01 | 1.6630E−03 | 2.7276E−04 |
| A16 = | −4.7085E−02 | 3.0336E−02 | 9.6954E−03 | −8.8203E−05 | −1.2566E−05 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th embodiment | | | |
|---|---|---|---|
| f [mm] | 3.01 | (R3 + R4)/(R3 − R4) | −1.76 |
| Fno | 2.35 | R5/R1 | 1.17 |
| HFOV [deg.] | 43.0 | R5/f | 0.50 |
| V3/(V2 + V4) | 1.31 | f/f2 | −0.76 |
| T23/T12 | 0.25 | |f4|/f5 | 0.64 |
| T34/T12 | 1.59 | (f/f5) − (f/f4) | 1.25 |
| T34/(T12 + T23 + T45) | 1.16 | FOV [deg.] | 86.0 |

7th Embodiment

Figure 13:
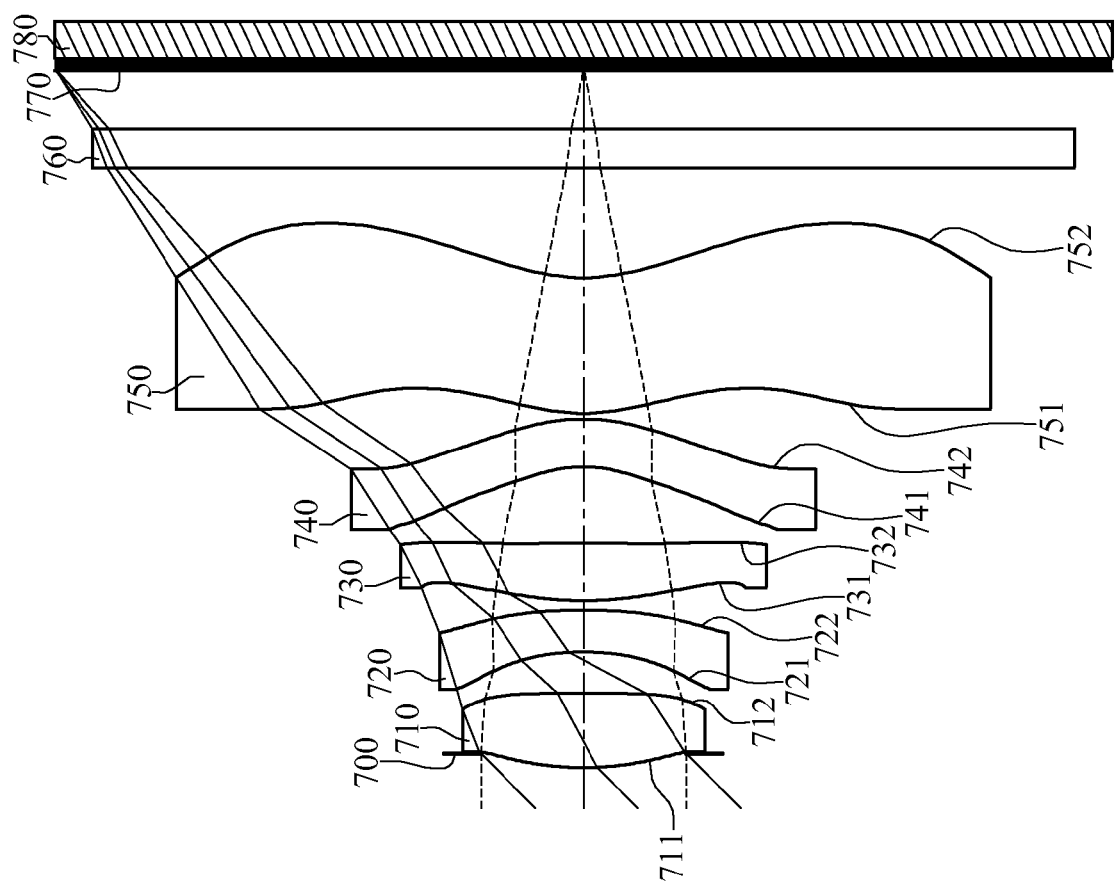
FIG. 13 is a schematic view of an image capturing device according to the 7th embodiment of the present disclosure.
Figure 14:
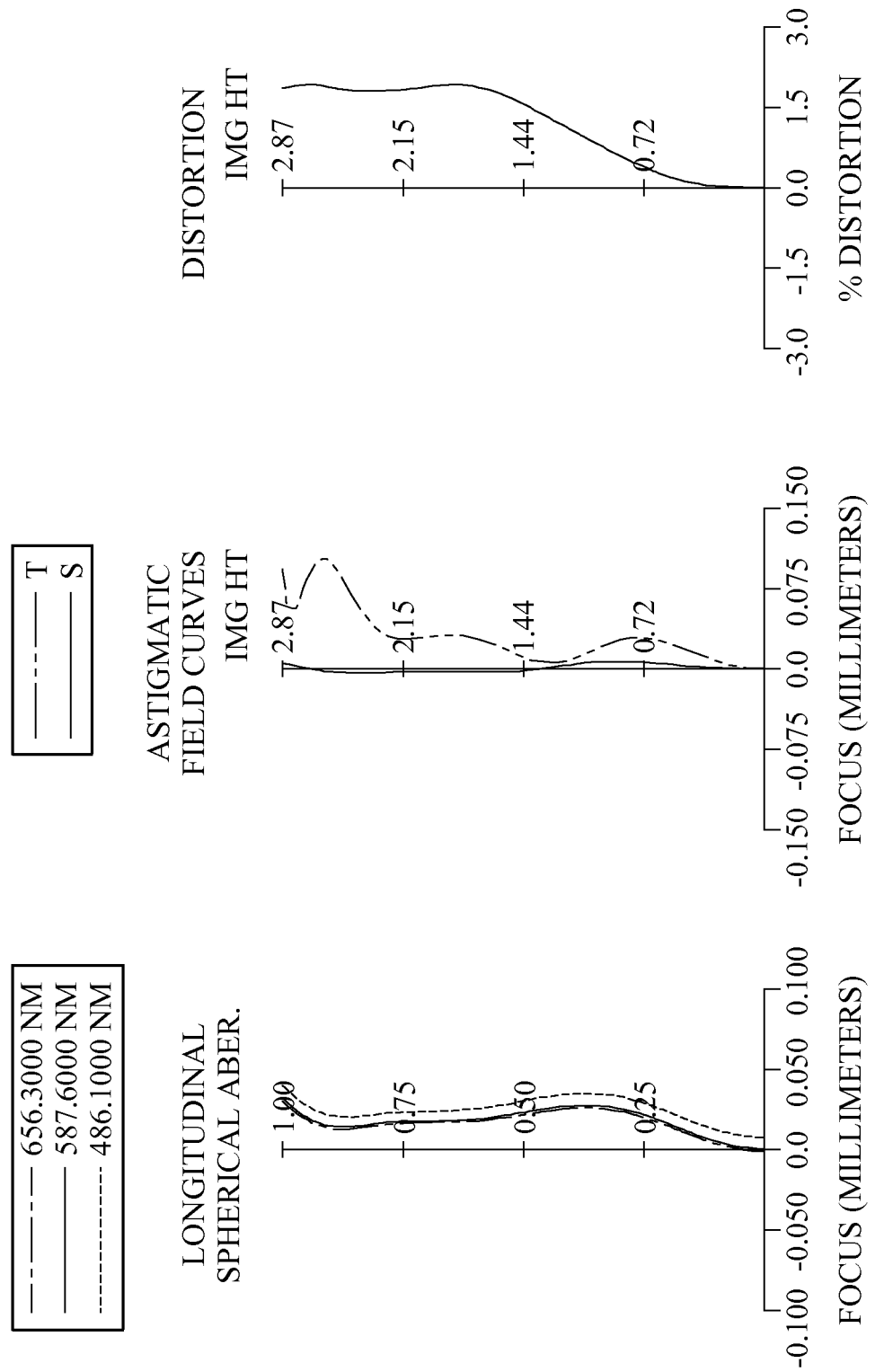
FIG. 14 shows, in order from left to right, spherical aberration curves, astigmatic field curves and a distortion curve of the image capturing device according to the 7th embodiment.

FIG. 13 is a schematic view of an image capturing device according to the 7th embodiment of the present disclosure. FIG. 14 shows, in order from left to right, spherical aberration curves, astigmatic field curves and a distortion curve of the image capturing device according to the 7th embodiment. In FIG. 13, the image capturing device includes a photographing optical lens assembly and an image sensor 780. The photographing optical lens assembly includes, in order from an object side to an image side, an aperture stop 700, a first lens element 710, a second lens element 720, a third lens element 730, a fourth lens element 740, a fifth lens element 750, an IR-cut filter 760 and an image plane 770, wherein the image sensor 780 is disposed on or near the image plane 770, and the photographing optical lens assembly has a total of five lens elements (710-750) with refractive power.

The first lens element 710 with positive refractive power has an object-side surface 711 being convex in a paraxial region thereof and an image-side surface 712 being convex in a paraxial region thereof. The first lens element 710 is made of plastic material, and the object-side surface 711 and the image-side surface 712 of the first lens element 710 are aspheric.

The second lens element 720 with negative refractive power has an object-side surface 721 being concave in a paraxial region thereof and an image-side surface 721 being convex in a paraxial region thereof. The second lens element 720 is made of plastic material, and the object-side surface 721 and the image-side surface 722 of the second lens element 720 are aspheric.

The third lens element 730 with positive refractive power has an object-side surface 731 being convex in a paraxial region thereof and an image-side surface 732 being convex in a paraxial region thereof. The third lens element 730 is made of plastic material, and the object-side surface 731 and the image-side surface 732 of the third lens element 730 are aspheric. Furthermore, both of the object-side surface 731 and the image-side surface 732 of the third lens element 730 have at least one inflection point in an off-axis region thereof.

The fourth lens element 740 with negative refractive power has an object-side surface 741 being concave in a paraxial region thereof and an image-side surface 742 being convex in a paraxial region thereof. The fourth lens element 740 is made of plastic material, and the object-side surface 741 and the image-side surface 742 of the fourth lens element 740 are aspheric.

The fifth lens element 750 with positive refractive power has an object-side surface 751 being convex in a paraxial region thereof and an image-side surface 752 being concave in a paraxial region thereof. The fifth lens element 750 is made of plastic material, and the object-side surface 751 and the image-side surface 752 of the fifth lens element 750 are aspheric. The image-side surface 752 of the fifth lens element 750 has at least one convex shape in an off-axis region thereof.

The IR-cut filter 760 is made of glass and located between the fifth lens element 750 and the image plane 770, and will not affect the focal length of the photographing optical lens assembly.

The detailed optical data of the 7th embodiment are shown in Table 13 and the aspheric surface data are shown in Table 14 below.

TABLE 13

7th Embodiment
f = 2.83 mm, Fno = 2.53, HFOV = 44.8 deg.

| Surface # | | Curvature Radius | Thickness | | Material | Index | Abbe # | Focal Length |
|---|---|---|---|---|---|---|---|---|
| 0 | Object | Plano | Infinity | | | | | |
| 1 | Ape. Stop | Plano | −0.077 | | | | | |
| 2 | Lens 1 | 1.601 | ASP | 0.405 | Plastic | 1.544 | 55.9 | 2.88 |
| 3 | | −69.318 | ASP | 0.225 | | | | |
| 4 | Lens 2 | −1.278 | ASP | 0.230 | Plastic | 1.640 | 23.3 | −3.72 |
| 5 | | −2.958 | ASP | 0.051 | | | | |
| 6 | Lens 3 | 2.087 | ASP | 0.313 | Plastic | 1.544 | 55.9 | 2.94 |
| 7 | | −6.442 | ASP | 0.415 | | | | |
| 8 | Lens 4 | −0.651 | ASP | 0.260 | Plastic | 1.640 | 23.3 | −4.14 |
| 9 | | −0.998 | ASP | 0.030 | | | | |
| 10 | Lens 5 | 0.998 | ASP | 0.741 | Plastic | 1.535 | 55.7 | 6.92 |
| 11 | | 1.012 | ASP | 0.600 | | | | |
| 12 | IR-cut filter | Plano | | 0.210 | Glass | 1.517 | 64.2 | — |
| 13 | | Plano | | 0.317 | | | | |
| 14 | Image | Plano | | — | | | | |

Note:
Reference wavelength is 587.6 nm (d-line).

TABLE 14

Aspheric Coefficients

| | Surface # | | | | |
|---|---|---|---|---|---|
| | 2 | 3 | 4 | 5 | 6 |
| k = | −1.6905E+00 | −9.9000E+01 | −8.9218E−01 | −4.8464E+00 | −3.6524E+00 |
| A4 = | −6.4564E−02 | −1.9330E−01 | −5.9484E−02 | −1.3097E−02 | 1.6124E−01 |
| A6 = | 7.2762E−01 | −1.5072E+00 | −1.8177E+00 | −2.6793E+00 | −1.5958E+00 |
| A8 = | −7.2977E+00 | 8.6272E+00 | 1.0670E+01 | 1.3673E+01 | 4.5910E+00 |
| A10 = | 2.9486E+01 | −3.6651E+01 | −3.3778E+01 | −3.2307E+01 | −6.8176E+00 |
| A12 = | −6.3586E+01 | 7.3079E+01 | 5.4542E+01 | 4.1299E+01 | 4.6454E+00 |
| A14 = | 5.1458E+01 | −5.3580E+01 | −1.9627E+01 | −2.6284E+01 | −4.9996E−01 |
| A16 = | — | — | −2.0375E+01 | 6.0812E+00 | −9.4569E−01 |

TABLE 14-continued

Aspheric Coefficients

| Surface # | | | | |
|---|---|---|---|---|
| 7 | 8 | 9 | 10 | 11 |
| k = −9.8889E+01 | −5.3082E+00 | −5.4845E+00 | −8.6389E+00 | −4.9341E+00 |
| A4 = 3.6286E−01 | 1.1467E−01 | −1.0761E−01 | −1.7309E−01 | −9.1099E−02 |
| A6 = −1.6917E−01 | 3.2026E−01 | 8.1471E−01 | 1.1913E−01 | 4.3270E−02 |
| A8 = −2.7215E+00 | −1.5990E+00 | −1.8406E+00 | −1.3134E−01 | −2.0652E−02 |
| A10 = 8.1136E+00 | 1.7486E+00 | 2.0130E+00 | 9.3423E−02 | 6.6096E−03 |
| A12 = −1.0459E+01 | −2.6871E−01 | −1.0723E+00 | −3.3191E−02 | −1.3003E−03 |
| A14 = 6.5332E+00 | −4.0205E−01 | 2.5163E−01 | 5.7334E−03 | 1.3913E−04 |
| A16 = −1.6185E+00 | 1.2012E−01 | −1.6988E−02 | −3.8846E−04 | −5.9983E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th embodiment | | | |
|---|---|---|---|
| f [mm] | 2.83 | (R3 + R4)/(R3 − R4) | −2.52 |
| Fno | 2.53 | R5/R1 | 1.30 |
| HFOV [deg.] | 44.8 | R5/f | 0.74 |
| V3/(V2 + V4) | 1.20 | f/f2 | −0.76 |
| T23/T12 | 0.23 | |f4|/f5 | 0.60 |
| T34/T12 | 1.84 | (f/f5) − (f/f4) | 1.09 |
| T34/(T12 + T23 + T45) | 1.36 | FOV [deg.] | 89.6 |

8th Embodiment

Figure 15:
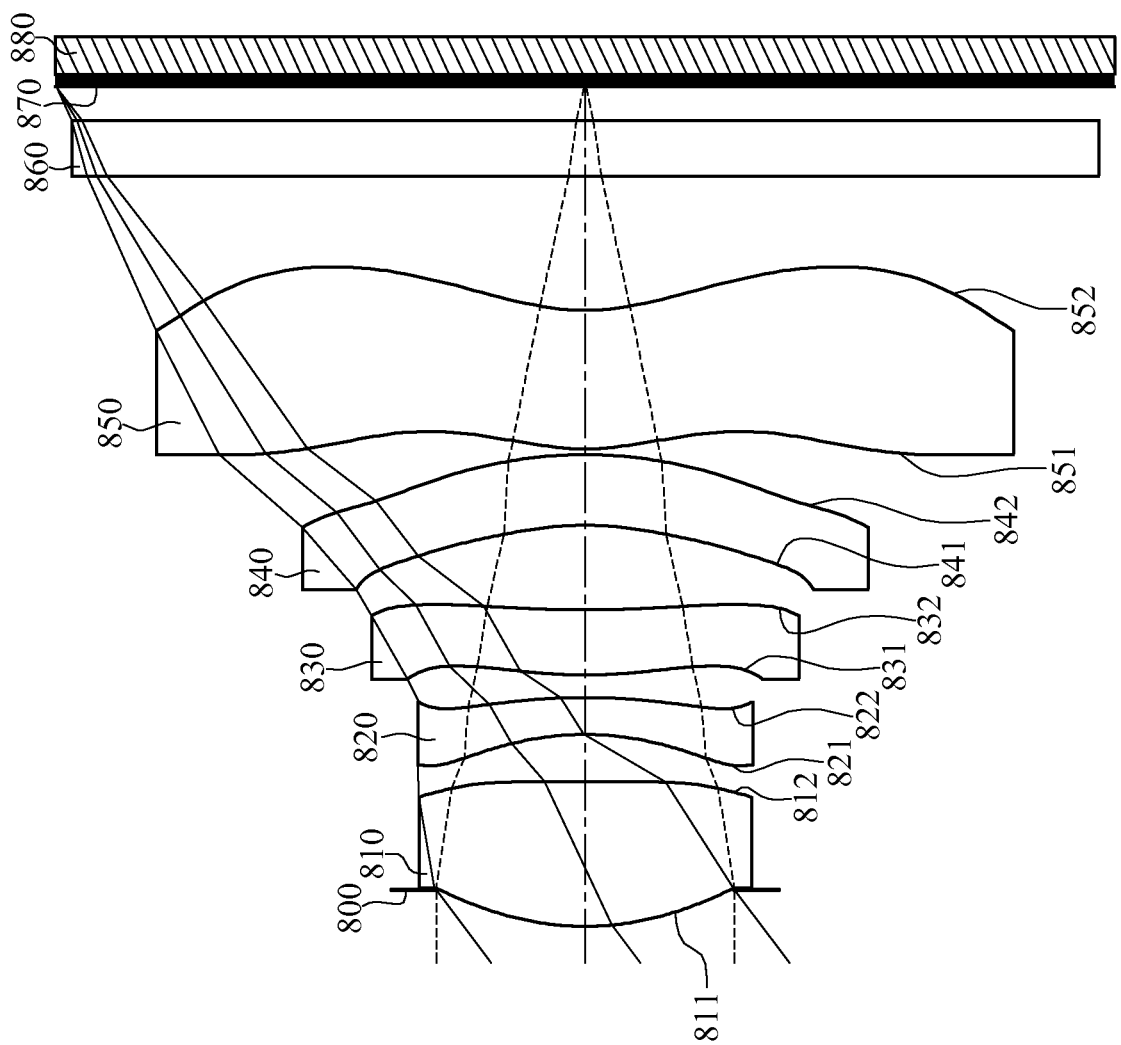
FIG. 15 is a schematic view of an image capturing device according to the 8th embodiment of the present disclosure.
Figure 16:
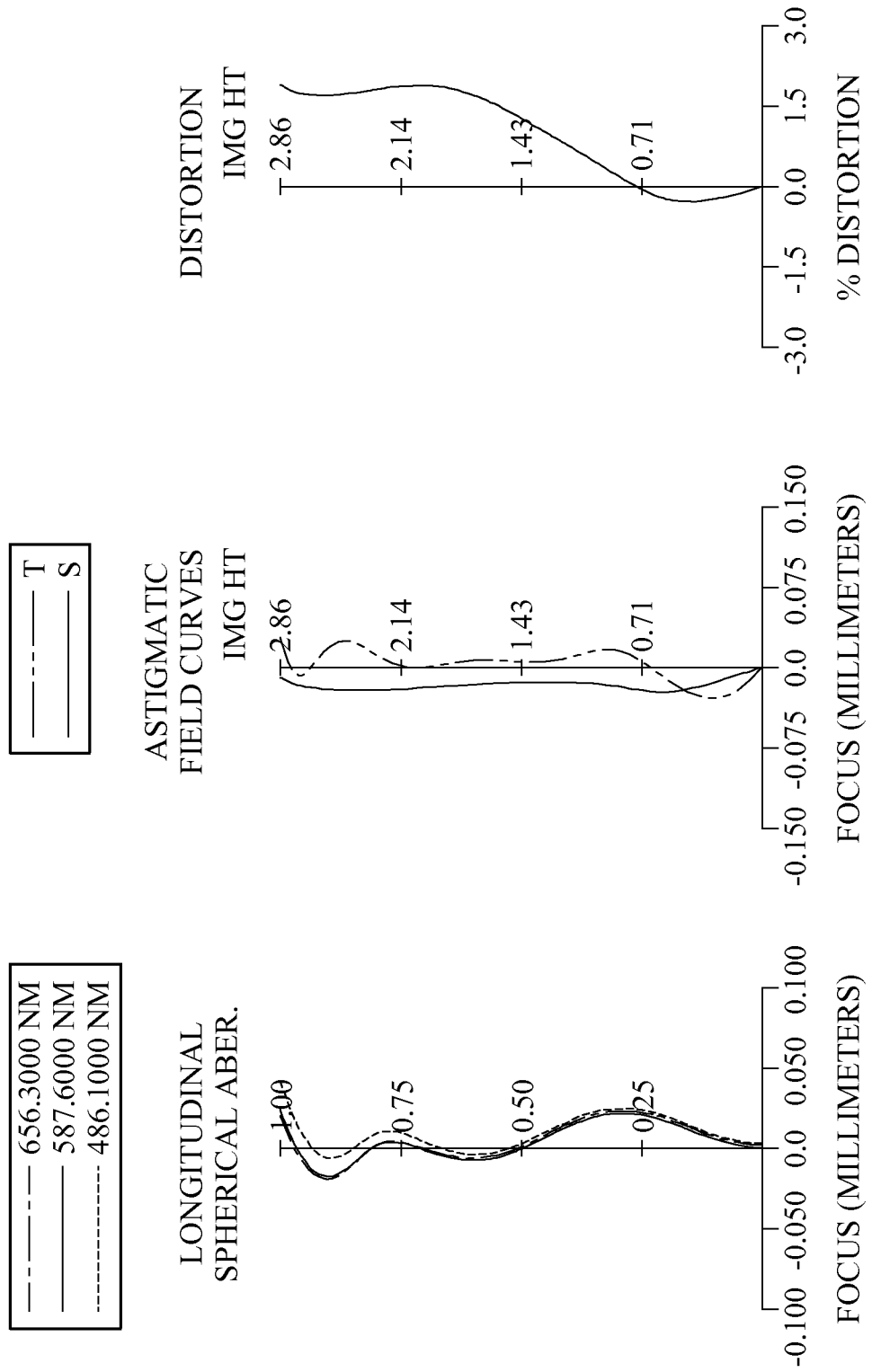
FIG. 16 shows, in order from left to right, spherical aberration curves, astigmatic field curves and a distortion curve of the image capturing device according to the 8th embodiment.

FIG. 15 is a schematic view of an image capturing device according to the 8th embodiment of the present disclosure. FIG. 16 shows, in order from left to right, spherical aberration curves, astigmatic field curves and a distortion curve of the image capturing device according to the 8th embodiment. In FIG. 15, the image capturing device includes a photographing optical lens assembly and an image sensor 880. The photographing optical lens assembly includes, in order from an object side to an image side, an aperture stop 800, a first lens element 810, a second lens element 820, a third lens element 830, a fourth lens element 840, a fifth lens element 850, an IR-cut filter 860 and an image plane 870, wherein the image sensor 880 is disposed on or near the image plane 870, and the photographing optical lens assembly has a total of five lens elements (810-850) with refractive power.

The first lens element 810 with positive refractive power has an object-side surface 811 being convex in a paraxial region thereof and an image-side surface 812 being convex in a paraxial region thereof. The first lens element 810 is made of glass material, and the object-side surface 811 and the image-side surface 812 of the first lens element 810 are aspheric.

The second lens element 820 with negative refractive power has an object-side surface 821 being concave in a paraxial region thereof and an image-side surface 821 being convex in a paraxial region thereof. The second lens element 820 is made of plastic material, and the object-side surface 821 and the image-side surface 822 of the second lens element 820 are aspheric.

The third lens element 830 with positive refractive power has an object-side surface 831 being convex in a paraxial region thereof and an image-side surface 832 being concave in a paraxial region thereof. The third lens element 830 is made of plastic material, and the object-side surface 831 and the image-side surface 832 of the third lens element 830 are aspheric. Furthermore, both of the object-side surface 831 and the image-side surface 832 of the third lens element 830 have at least one inflection point in an off-axis region thereof.

The fourth lens element 840 with negative refractive power has an object-side surface 841 being concave in a paraxial region thereof and an image-side surface 842 being convex in a paraxial region thereof. The fourth lens element 840 is made of plastic material, and the object-side surface 841 and the image-side surface 842 of the fourth lens element 840 are aspheric.

The fifth lens element 850 with positive refractive power has an object-side surface 851 being convex in a paraxial region thereof and an image-side surface 852 being concave in a paraxial region thereof. The fifth lens element 850 is made of plastic material, and the object-side surface 851 and the image-side surface 852 of the fifth lens element 850 are aspheric. The image-side surface 852 of the fifth lens element 850 has at least one convex shape in an off-axis region thereof.

The IR-cut filter 860 is made of glass and located between the fifth lens element 850 and the image plane 870, and will not affect the focal length of the photographing optical lens assembly.

The detailed optical data of the 8th embodiment are shown in Table 15 and the aspheric surface data are shown in Table 16 below

TABLE 15

8th Embodiment
f = 3.74 mm, Fno = 2.32, HFOV = 36.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.199 | | | | |

TABLE 15-continued

8th Embodiment
f = 3.74 mm, Fno = 2.32, HFOV = 36.8 deg.

| Surface # | | Curvature Radius | Thickness | Material | Index | Abbe # | Focal Length |
|---|---|---|---|---|---|---|---|
| 2 | Lens 1 | 1.570 ASP | 0.784 | Glass | 1.542 | 62.9 | 2.86 |
| 3 | | −117.157 ASP | 0.254 | | | | |
| 4 | Lens 2 | −1.444 ASP | 0.200 | Plastic | 1.639 | 23.5 | −4.63 |
| 5 | | −2.973 ASP | 0.122 | | | | |
| 6 | Lens 3 | 2.684 ASP | 0.353 | Plastic | 1.544 | 55.9 | 7.22 |
| 7 | | 8.081 ASP | 0.457 | | | | |
| 8 | Lens 4 | −1.423 ASP | 0.382 | Plastic | 1.639 | 23.5 | −7.56 |
| 9 | | −2.227 ASP | 0.030 | | | | |
| 10 | Lens 5 | 1.353 ASP | 0.750 | Plastic | 1.565 | 40.0 | 17.13 |
| 11 | | 1.258 ASP | 0.726 | | | | |
| 12 | IR-cut filter | Plano | 0.300 | Glass | 1.517 | 64.2 | — |
| 13 | | Plano | 0.185 | | | | |
| 14 | Image | Plano | — | | | | |

Note:
Reference wavelength is 587.6 nm (d-line).

TABLE 16

Aspheric Coefficients

| Surface # | 2 | 3 | 4 | 5 | 6 |
|---|---|---|---|---|---|
| k = | −1.0952E+00 | −1.0000E+00 | −5.2055E+00 | −4.2225E+01 | −2.8329E+00 |
| A4 = | −2.5246E−03 | −5.2545E−02 | 3.1982E−02 | −2.7792E−02 | −1.3163E−01 |
| A6 = | 1.8483E−01 | −5.1851E−01 | −4.9692E−01 | −2.4175E−01 | −1.2346E−01 |
| A8 = | −7.2096E−01 | 2.2433E+00 | 1.7601E+00 | 1.4389E+00 | 2.2078E−01 |
| A10 = | 1.2933E+00 | −6.1690E+00 | −4.1847E+00 | −3.1196E+00 | −2.9360E−01 |
| A12 = | −1.2272E+00 | 8.0819E+00 | 6.5047E+00 | 3.7840E+00 | 1.0145E−01 |
| A14 = | 4.4167E−01 | −3.8126E+00 | −4.2547E+00 | −2.0656E+00 | 5.9871E−03 |
| A16 = | — | — | 6.9786E−01 | 4.2724E−01 | −1.7676E−02 |

| Surface # | 7 | 8 | 9 | 10 | 11 |
|---|---|---|---|---|---|
| k = | −1.0000E+00 | −2.5844E+01 | −3.1327E−01 | −1.2838E+01 | −5.4605E+00 |
| A4 = | 6.2298E−02 | −1.5142E−01 | 4.1509E−02 | −1.3474E−01 | −9.8217E−02 |
| A6 = | −2.8878E−01 | 5.9924E−01 | 3.2482E−02 | −1.1209E−02 | 4.2843E−02 |
| A8 = | 3.7814E−01 | −1.6720E+00 | −2.2542E−01 | 5.4510E−02 | −1.5809E−02 |
| A10 = | −3.0590E−01 | 2.4838E+00 | 3.2208E−01 | −2.6373E−02 | 4.0173E−03 |
| A12 = | 1.4112E−01 | −2.0156E+00 | −1.9167E−01 | 5.9794E−03 | −6.6904E−04 |
| A14 = | −3.4219E−02 | 8.6405E−01 | 5.2011E−02 | −6.7708E−04 | 6.3729E−05 |
| A16 = | 1.4578E−03 | −1.5678E−01 | −5.3565E−03 | 3.0829E−05 | −2.4910E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th embodiment | | | |
|---|---|---|---|
| f [mm] | 3.74 | (R3 + R4)/(R3 − R4) | −2.89 |
| Fno | 2.32 | R5/R1 | 1.71 |
| HFOV [deg.] | 36.8 | R5/f | 0.72 |
| V3/(V2 + V4) | 1.19 | f/f2 | −0.81 |
| T23/T12 | 0.48 | |f4|/f5 | 0.44 |
| T34/T12 | 1.80 | (f/f5) − (f/f4) | 0.71 |
| T34/(T12 + T23 + T45) | 1.13 | FOV [deg.] | 73.6 |

The aforementioned imaging device may be installed in but not limited to a mobile terminal. The design of the imaging device has the second lens element being concave in an object-side surface in a paraxial region thereof and an image-side surface being convex in a paraxial region thereof. The axial distances between each lens element is also properly arranged. Therefore, the mobile terminal can make the peripheral region of the photographing optical lens assembly equipped with larger field of view and short total track length obtain superior image quality through the aforementioned designs of the imaging device.

The foregoing description, for purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising, in order from an object side to an image side:
    a first lens element with positive refractive power having an object-side surface being convex in a paraxial region thereof;
    a second lens element with negative refractive power having an object-side surface being concave in a paraxial region thereof and an image-side surface being convex in a paraxial region thereof;
    a third lens element with positive refractive power having an object-side surface being convex in a paraxial region thereof;
    a fourth lens element with negative refractive power having an object-side surface being concave in a paraxial region thereof and an image-side surface being convex in a paraxial region thereof, wherein the object-side surface and the image-side surface of the fourth lens element are aspheric; and
    a fifth lens element with refractive power having an object-side surface being convex in a paraxial region thereof and an image-side surface being concave in a paraxial region thereof, wherein the object-side surface and the image-side surface of the fifth lens element are aspheric, and the image-side surface of the fifth lens element has at least one convex shape in an off-axis region thereof;
    wherein the photographing optical lens assembly has a total of five lens elements with refractive power, an axial distance between the first lens element and the second lens element is T12, an axial distance between the second lens element and the third lens element is T23, an axial distance between the third lens element and the fourth lens element is T34, a focal length of the photographing optical lens assembly is f, a focal length of the fourth lens element is f4, a focal length of the fifth lens element is f5, and the following conditions are satisfied:

$T23/T12<1.2$;

$0.75<T34/T12<5.0$; and $0.50<(f/f5)-(f/f4)$.

2. The photographing optical lens assembly of claim 1, wherein the focal length of the photographing optical lens assembly is f, a curvature radius of the object-side surface of the third lens element is R5, and the following condition is satisfied:

$0.3<R5/f<2.5$.

3. The photographing optical lens assembly of claim 2, wherein the fifth lens element has positive refractive power.

4. The photographing optical lens assembly of claim 2, wherein the focal length of the photographing optical lens assembly is f, a focal length of the second lens element is f2, and the following condition is satisfied:

$f/f2<-0.40$.

5. The photographing optical lens assembly of claim 4, wherein at least one of the object-side surface and an image-side surface of the third lens element has at least one inflection point in an off-axis region thereof.

6. The photographing optical lens assembly of claim 1, wherein the focal length of the photographing optical lens assembly is f, a curvature radius of the object-side surface of the third lens element is R5, and the following condition is satisfied:

$0.3<R5/f<1.0$.

7. The photographing optical lens assembly of claim 1, wherein a curvature radius of the object-side surface of the second lens element is R3, a curvature radius of the image-side surface of the second lens element is R4, and the following condition is satisfied:

$(R3+R4)/(R3-R4)<-1.25$.

8. The photographing optical lens assembly of claim 1, wherein an Abbe number of the second lens element is V2, an Abbe number of the third lens element is V3, an Abbe number of the fourth lens element is V4, and the following condition is satisfied:

$1.0<V3/(V2+V4)<2.0$.

9. The photographing optical lens assembly of claim 1, wherein a maximal field of view of the photographing optical lens assembly is FOV, and the following condition is satisfied:

80 degrees<FOV<100 degrees.

10. The photographing optical lens assembly of claim 1, wherein a curvature radius of the object-side surface of the first lens element is R1, a curvature radius of the object-side surface of the third lens element is R5, and the following condition is satisfied:

$0.5<R5/R1<2.0$.

11. The photographing optical lens assembly of claim 1, wherein the focal length of the photographing optical lens assembly is f, the focal length of the fourth lens element is f4, the focal length of the fifth lens element is f5, and the following condition is satisfied:

$0.60<(f/f5)-(f/f4)<1.60$.

12. The photographing optical lens assembly of claim 1, wherein the focal length of the fourth lens element is f4, the focal length of the fifth lens element is f5, and the following condition is satisfied:

$0.55<|f4|/f5<1.20$.

13. The photographing optical lens assembly of claim 1, wherein the axial distance between the first lens element and the second lens element is T12, the axial distance between the second lens element and the third lens element is T23, and the following condition is satisfied:

$T23/T12<0.75$.

14. The photographing optical lens assembly of claim 1, wherein the axial distance between the first lens element and the second lens element is T12, the axial distance between the second lens element and the third lens element is T23, the axial distance between the third lens element and the fourth lens element is T34, an axial distance between the fourth lens element and the fifth lens element is T45, and the following condition is satisfied:

$0.9<T34/(T12+T23+T45)<2.0$.

15. An image capturing device, comprising:
    the photographing optical lens assembly of claim 1; and
    an image sensor, wherein the image sensor is located on the image side of the photographing optical lens assembly.

16. A mobile terminal, comprising:
the image capturing device of claim 15.

17. A photographing optical lens assembly comprising, in order from an object side to an image side:
a first lens element with positive refractive power having an object-side surface being convex in a paraxial region thereof;
a second lens element with negative refractive power having an object-side surface being concave in a paraxial region thereof and an image-side surface being convex in a paraxial region thereof;
a third lens element with positive refractive power having an object-side surface being convex in a paraxial region thereof;
a fourth lens element with negative refractive power having an object-side surface being concave in a paraxial region thereof and an image-side surface being convex in a paraxial region thereof, wherein the object-side surface and the image-side surface of the fourth lens element are aspheric; and
a fifth lens element with refractive power having an object-side surface being convex in a paraxial region thereof and an image-side surface being concave in a paraxial region thereof, wherein the object-side surface and the image-side surface of the fifth lens element are aspheric, and the image-side surface of the fifth lens element has at least one convex shape in an off-axis region thereof;
wherein the photographing optical lens assembly has a total of five lens elements with refractive power, an axial distance between the first lens element and the second lens element is T12, an axial distance between the second lens element and the third lens element is T23, an axial distance between the third lens element and the fourth lens element is T34, a curvature radius of the object-side surface of the second lens element is R3, a curvature radius of the image-side surface of the second lens element is R4, an Abbe number of the second lens element is V2, an Abbe number of the third lens element is V3, an Abbe number of the fourth lens element is V4, and the following conditions are satisfied:

$T23/T12<1.2$;

$0.75<T34/T12<5.0$;

$(R3+R4)/(R3-R4)<-1.25$; and $1.0<V3/(V2+V4)<2.0$.

18. The photographing optical lens assembly of claim 17, wherein the fifth lens element has positive refractive power.

19. The photographing optical lens assembly of claim 18, wherein a focal length of the photographing optical lens assembly is f, a focal length of the fourth lens element is f4, a focal length of the fifth lens element is f5, and the following condition is satisfied:

$0.60<(f/f5)-(f/f4)<1.60$.

20. The photographing optical lens assembly of claim 17, wherein a maximal field of view of the photographing optical lens assembly is FOV, and the following condition is satisfied:

80 degrees<FOV<100 degrees.

21. The photographing optical lens assembly of claim 17, wherein a curvature radius of the object-side surface of the first lens element is R1, a curvature radius of the object-side surface of the third lens element is R5, and the following condition is satisfied:

$0.5<R5/R1<2.0$.

22. The photographing optical lens assembly of claim 17, wherein at least one of the object-side surface and an image-side surface of the third lens element has at least one inflection point in an off-axis region thereof.

23. The photographing optical lens assembly of claim 17, wherein the axial distance between the first lens element and the second lens element is T12, the axial distance between the second lens element and the third lens element is T23, the axial distance between the third lens element and the fourth lens element is T34, an axial distance between the fourth lens element and the fifth lens element is T45, and the following condition is satisfied:

$0.9<T34/(T12+T23+T45)<2.0$.

24. An image capturing device, comprising:
the photographing optical lens assembly of claim 17; and
an image sensor, wherein the image sensor is located on the image side of the photographing optical lens assembly.

25. A mobile terminal, comprising:
the image capturing device of claim 24.

* * * * *